United States Patent [19]
Matsui et al.

[11] Patent Number: 5,774,701
[45] Date of Patent: Jun. 30, 1998

[54] MICROPROCESSOR OPERATING AT HIGH AND LOW CLOK FREQUENCIES

[75] Inventors: Shigezumi Matsui, Kodaira; Mitsuyoshi Yamamoto, Higashimurayama; Shinichi Yoshioka, Kodaira; Susumu Narita, Kokubunji; Ikuya Kawasaki, Kodaira; Susumu Kaneko, Kokubunji; Kiyoshi Hasegawa, Fussa, all of Japan

[73] Assignee: Hitachi, Ltd., Tokyo, Japan

[21] Appl. No.: 500,227

[22] Filed: Jul. 10, 1995

[51] Int. Cl.[6] .................................................. G06F 1/04
[52] U.S. Cl. ........................................ 395/556; 395/560
[58] Field of Search .................................. 395/555, 556, 395/559, 560, 750, 750.04

[56] References Cited

U.S. PATENT DOCUMENTS

| | | | |
|---|---|---|---|
| 4,893,271 | 1/1990 | Davis et al. | 364/900 |
| 5,294,894 | 3/1994 | Gebara | 331/1 A |
| 5,537,581 | 7/1996 | Conary et al. | 395/550 |
| 5,586,308 | 12/1996 | Hawkins et al. | 395/556 |

*Primary Examiner*—Dennis M. Butler
*Attorney, Agent, or Firm*—Loudermilk & Associates

[57] ABSTRACT

A microprocessor incorporating a PLL circuit using a clock pulse having a relatively low frequency as an input clock signal of a reference frequency to form an oscillating pulse of a relatively high frequency by multiplying the input clock signal. In the microprocessor, the operation of the PLL circuit is stopped in the low-speed mode to supply the clock pulse of the relatively low frequency to the microprocessor as a system clock signal, and, in the high-speed mode, the PLL circuit is activated upon reception of an event requiring high-speed processing. Until the operation of the PLL circuit is stabilized and the request for high-speed processing comes, the above-mentioned clock pulse having the relatively low frequency is kept supplied continuously to the microprocessor as the system clock signal. This novel setup permits the high-speed switching of the microprocessor from the operating mode to the high-speed operating mode. Accordingly, the microprocessor may be kept operating until the output frequency of the PLL circuit is stabilized, thereby allowing the microprocessor to cope with an unpredictable situation such as the occurrence of a priority event or a failure.

34 Claims, 18 Drawing Sheets

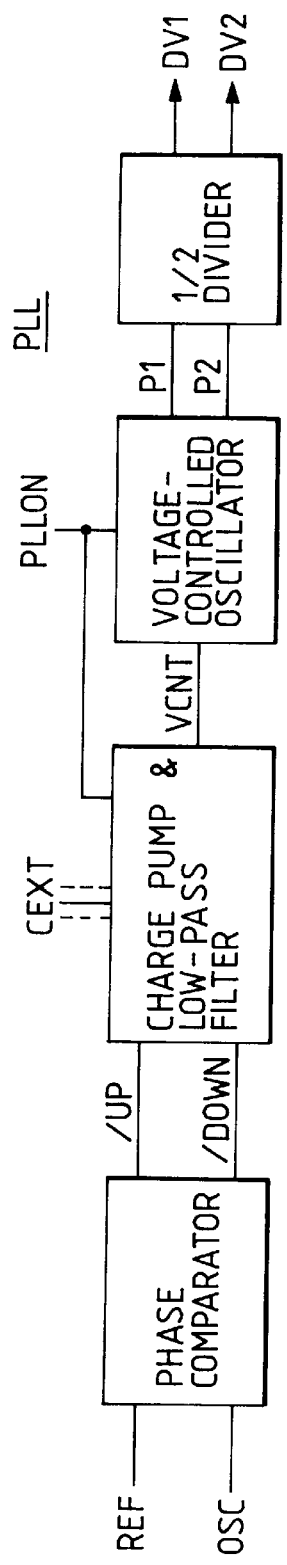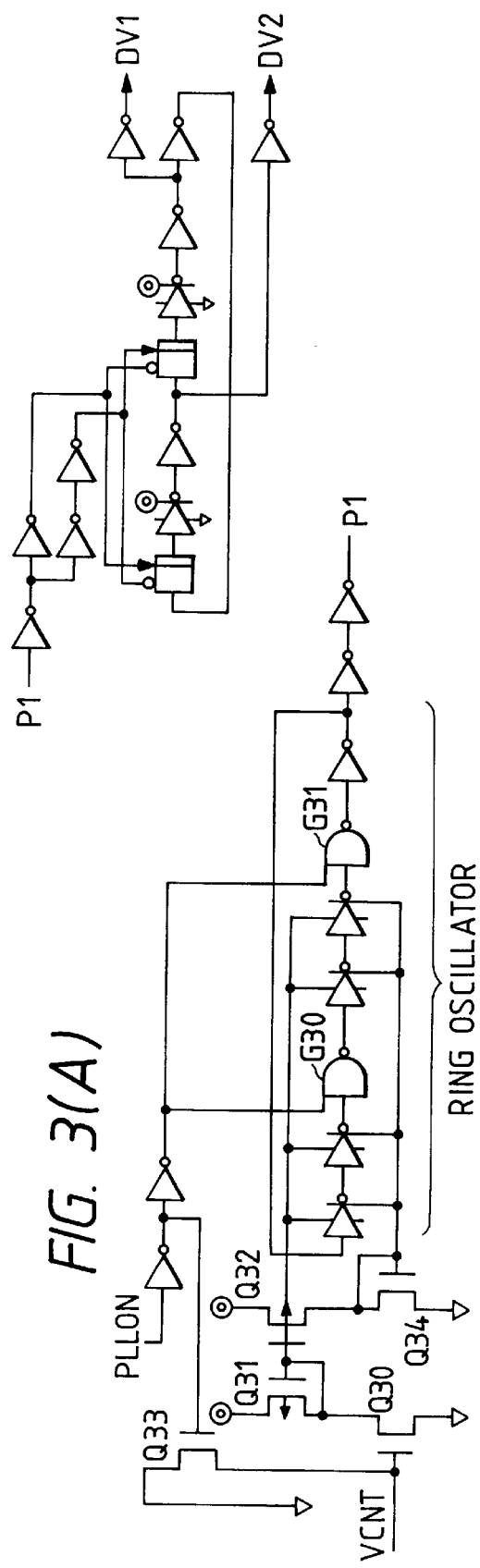

MICROPROCESSOR OPERATING AT HIGH AND LOW CLOK FREQUENCIES

BACKGROUND OF THE INVENTION

The present invention relates to a microprocessor and, more particularly, to a technology especially for effective use in a single-chip microcomputer for use in a portable information terminal or the like provided with an input pen, the single-chip microcomputer having a capability of multiplying a system clock frequency by using a PLL (Phase-Locked Loop).

There is a so-called portable information terminal having an input pen serving as man-machine interface and a microprocessor based on a stored program. Such a terminal is sometimes called a PDA (Personal Digital Assistant). With such a portable information terminal or the like, when it is in the normal state (for example, when it is displaying characters or the like), the above-mentioned microprocessor is operated in the low-speed mode. For example, when high-speed processing such as character recognition is required upon writing of characters with the input pen, the microprocessor is operated in the high-speed mode. The switching between the modes as required reduces the power consumption of the terminal. Compared with displaying or entering characters or the like, recognizing entered characters requires more complicated processing such as retrieving characters from a dictionary incorporated in the terminal that match the entered characters. To perform such complicated processing in a relatively short time, it is desired to operate the microprocessor in the high-speed mode. Conversely, the processes such as displaying and entering characters may be performed in a relatively short time even if the microprocessor is operated relatively slowly. Consequently, as mentioned above, the microprocessor is operated at a relatively low speed when displaying or entering characters or the like, thereby reducing the power consumption of the microprocessor. For character recognition, it is desired to operate the microprocessor at a relatively high speed to make the portable information terminal sufficiently practical.

Meanwhile, a PLL (Phase-Locked Loop) circuit is known that phase-locks with an input clock signal and generates an output clock signal having a frequency of predetermined multiples. A microprocessor is also known that incorporates such a PLL circuit. Before reaching the present invention, we thought of using the microprocessor incorporating the PLL circuit in the portable information terminal or the like. In such a case, the input clock signal of the PLL circuit is used for the system clock signal of the microprocessor operating in the standby state, or the low-speed mode and the output signal of the PLL circuit is used for the system clock signal of the microprocessor operating in the high-speed mode, thereby switching between the power consumption modes.

For the above-mentioned microprocessor incorporating the PLL circuit, the SH2/7600 series microprocessor is available from Hitachi Ltd. for example.

In the microprocessor incorporating the PLL circuit, if the input clock signal and the output clock signal of the PLL circuit are selectively used as the system clock signal of the microprocessor, the operational flow of the microprocessor is as shown in FIG. 18 for example. When the microprocessor is in the low-speed mode (step ST11), the PLL circuit is in the stopped state, in which a clock signal having a relatively low frequency is supplied as the system clock signal to the remaining parts of the microprocessor including its central processing unit (CPU). This clock signal drives the microprocessor to operate at a relatively slow speed, thereby reducing the power consumption. If a high-speed event has accurred in step ST12 and a request for the high-speed processing for the event is recognized in step ST13, the PLL circuit is activated. In step ST15, it is checked whether the frequency of the output clock signal of the activated PLL circuit has been stabilized. Until the stabilization is confirmed, the system clock signal to the microprocessor is stopped in step ST14 to prevent unstable clock pulses from being supplied to the microprocessor. In step ST15, when the stabilization of the PLL circuit operation has been confirmed, the high-speed clock signal, or the output clock signal of the PLL circuit is supplied to the microprocessor as a system clock signal. This puts the CPU and other components of the microprocessor into the high-speed mode (step ST16), upon which the high-speed processing necessary for character recognition and the like starts. When completion of the processing such as character recognition and the like is recognized in step ST17, the microprocessor is put in the low-speed mode (step ST11).

SUMMARY OF THE INVENTION

However, the above-mentioned constitution thought out prior to the present invention has a problem. Namely, it takes a relatively long time to switch the system clock signal to the high-speed clock after a request for starting the high-speed processing is made. This is because a relatively long time is required for the stabilization of the PLL circuit operation. In addition, during this time, the supply of the system clock signal to the microprocessor is stopped, so that the operations of the remaining parts of the microprocessor including the CPU are stopped. As a result, if a prioritized processing event or an unpredictable event such as a failure occurs during the pause of the system clock signal supply, no measure can be taken for it, thereby lowering the reliability of the microprocessor.

It is therefore a n object of the present invention to provide a microprocessor capable of quickly switching from low-speed mode to high-speed mode and taking measures against unpredictable events caused during the switching.

The above and other objects, features and advantages of the present invention will become more apparent from the accompanying drawings, in which like reference numerals are used to identify the same or similar parts in several views.

In carrying out the invention and according to one aspect thereof, there is provided a microprocessor incorporating a PLL circuit using a clock pulse having a relatively low frequency as an input clock signal of a reference frequency to form an oscillating pulse of a relatively high frequency by multiplying the input clock signal. In the microprocessor, the operation of the PLL circuit is stopped in the low-speed mode to supply the clock pulse of the relatively low frequency to the microprocessor as a system clock signal, and, in the high-speed mode, the PLL circuit is activated upon reception of an event requiring high-speed processing. Until the operation of the PLL circuit is stabilized and the request for high-speed processing comes, the above-mentioned clock pulse having the relatively low frequency is kept supplied continuously to the microprocessor as the system clock signal. When the operation of the PLL circuit is stabilized and the request comes, the oscillating pulse having the relatively high frequency formed by the PLL circuit is supplied to the microprocessor as the system clock.

According to the above-mentioned novel constitution, the microprocessor is switched from the low-speed mode to the high-speed mode at reception of the request for high-speed processing. In addition, after the PLL circuit is activated, the clock signal corresponding to the low-speed mode is kept supplied continuously to the microprocessor as the system clock signal, ensuring the uninterrupted operation of the microprocessor. This allows the microprocessor to take measures for the occurrence of a prioritized event or an unpredictable event such as some failure. As a result, the microprocessor is implemented that performs switching from the low-speed mode to the high-speed mode and takes measures against unpredictable events caused during the mode switching.

BRIEF DESCRIPTION OF THE DRAWINGS

FIG. 2 is a block diagram illustrating one preferred embodiment of a PLL circuit incorporated in the clock pulse generator of FIG. 1;

FIGS. 3(A) and (B) are partial diagrams illustrating one preferred embodiment of the PLL circuit of FIG. 2;

DETAILED DESCRIPTION OF PREFERRED EMBODIMENTS

Figure 1:
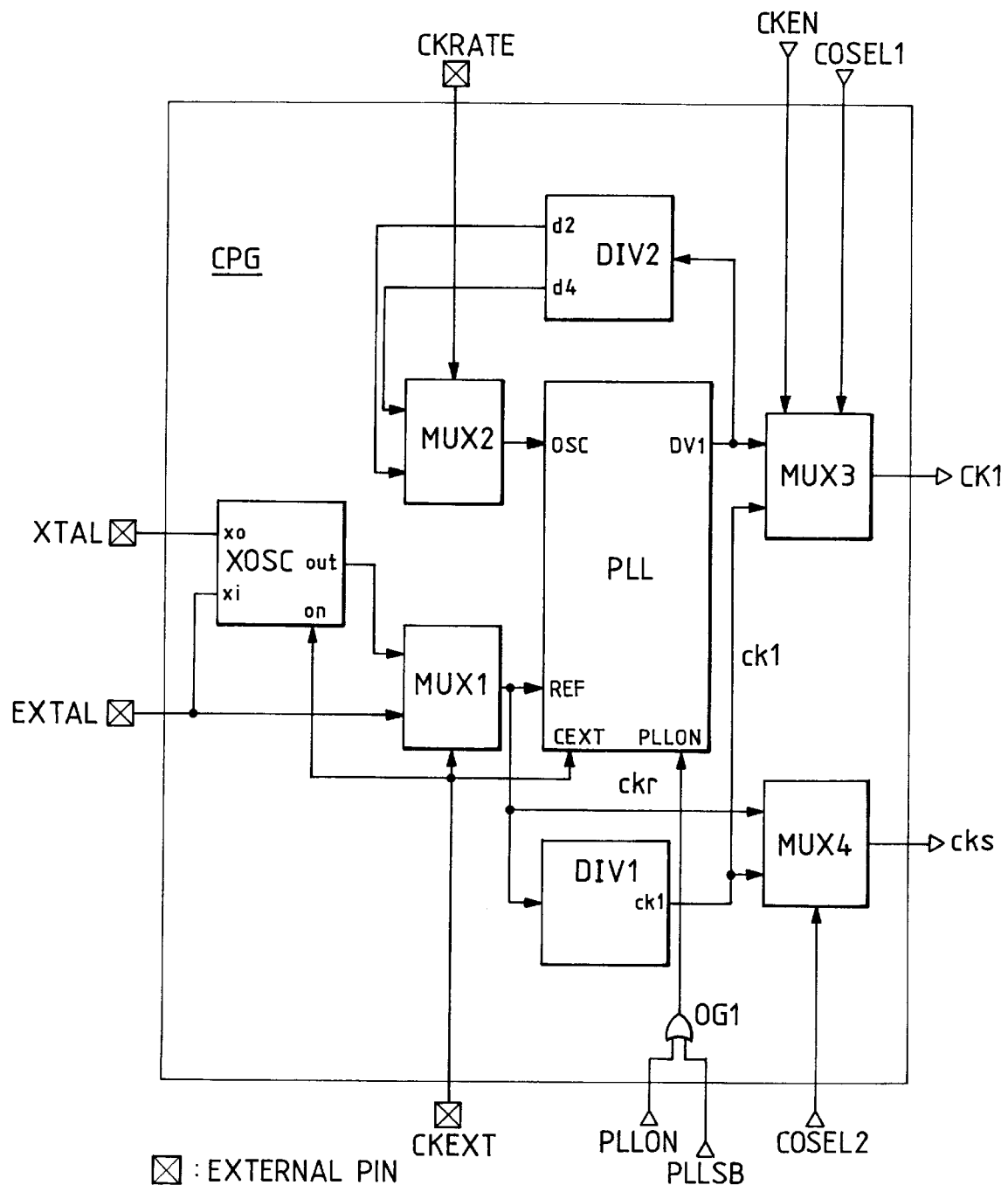
FIG. 1 is a block diagram illustrating one preferred embodiment of a clock pulse generator incorporated in the microprocessor associated with the present invention.

Now, referring to FIG. 1, there is shown a block diagram illustrating one preferred embodiment of the clock pulse generator CPG incorporated in the microprocessor associated with the present invention. Each circuit block shown is formed on one semiconductor substrate such as a single silicon crystal by a known semiconductor integrated circuit fabrication technique along with other blocks that constitute the microprocessor together.

In FIG. 1, an XTAL, an EXTAL, a CKEXT, and a CKRATE are external pins provided on the above-mentioned microprocessor. The external pins XTAL and EXTAL are connected with a crystal resonator having a predetermined natural oscillation frequency. An oscillator XOSC containing the crystal resonator and having pins xo and xi connected to the external pins XTAL and EXTAL respectively forms oscillation pulses of a relatively low frequency corresponding to the low-speed operation mode. The oscillator XOSC is selectively activated upon reception of the high level of a control signal CKEXT via a control pin on. The control signal CKEXT is also used for controlling a multiplexer MUX1 to be described below. Therefore, by means of the control signal CKEXT supplied via the external pin CKEXT, the operation of the oscillator XOSC may be stopped and the oscillation pulse having a relatively low frequency corresponding to the low-speed operation mode may be supplied from the external pin EXTAL.

By the above-mentioned control signal CKEXT, the multiplexer MUX1 is controlled. Namely, according to the level of the control signal CKEXT, the multiplexer MUX1 switches between uses of the oscillation pulse coming from the incorporated oscillator XOSC and a clock pulse coming from the external pin EXTAL. If the clock pulse from the external pin EXTAL is to be used, the operation of the oscillator XOSC is stopped by the control signal CKEXT. Therefore, the crystal resonator need not be connected to the external pins XTAL and EXTAL.

A clock pulse ckr (a first clock signal), a relatively low, first frequency outputted from the multiplexer MUX1, is supplied to the input pin of a ½ divider DIV1 and to a reference frequency input pin REF of a PLL circuit and to one of the input pins of a multiplexer MUX4.

The ½ divider DIV1 divides the clock pulse ckr to form a clock pulse ck1 having a frequency that is one half of the frequency of the clock pulse ckr. The clock pulse ck1 is supplied to the other input pin of the multiplexer MUX4 and one of the input pins of an output selecting multiplexer MUX3.

The PLL circuit, based on the input clock signal to be supplied to the reference frequency input pins REF, or the clock pulse ckr, generates a clock pulse DV1 (a second clock signal) phase-locked with the clock pulse ckr and having a second frequency, namely a frequency that is an integral multiple of the frequency of the clock pulse ckr. The clock pulse DV1 is supplied to the other input pin of the multiplexer MUX3 and the input pin of a divider DIV2. In the present embodiment, the divider DIV2 forms two divided outputs d2 and d4 corresponding to the high-speed operation mode, but not necessarily limited thereto. These divided outputs are selectively supplied to an oscillation input pin OSC of the PLL circuit via the multiplexer MUX2.

The multiplexer MUX2, based on a switching control signal CKRATE to be supplied to the external pin CKRATE, selects one of the two divided outputs d2 and d4 and transmits the selected output to the oscillation input pin OSC of the PLL circuit. For example, if the divided output d2 is selected, the PLL circuit operates so as to match the phase of the divided output d2 with the phase of the reference frequency input REF. For this purpose, the output of the PLL circuit, namely the clock pulse DV1, has a frequency multiplied corresponding to the inverse of the dividing ratio. Likewise, if the divided output d4 is selected, the PLL circuit operates so as to match the phase of the divided output d4 with the phase of the reference frequency input REF. The clock pulse DV1 has a frequency multiplied corresponding to the inverse of the dividing ratio. Thus, the clock pulses DV1 having two frequencies for the high-speed operation mode may be formed selectively.

In the present embodiment, the operation of the PLL circuit is selectively halted according to an output signal of an OR gate OG1 supplied to a control pin PLLON of the PLL circuit. To one input pin and the other input pin of the OR gate OG1, a PLL control signal PLLON and a PLL standby signal PLLSB are respectively supplied from a clock controller CKC (to be described with reference to FIGS. 8 and 19), not shown. It should be noted that the PLL control signal PLLON and the PLL standby signal PLLSB are selectively made high when a predetermined register is set by the central processing unit to be described. Therefore, if the microprocessor is used on a portable information terminal for example, the PLL standby signal is made high at start of writing a character with the input pen, or at recognition of an event requiring high-speed processing to put the PLL circuit in the operating state in advance, thereby stabilizing the output frequency of the PLL circuit. Thus, the PLL circuit is ready for high-speed processing.

When the control signal at the control pin PLLON, or the output of the OR gate OR1, is made high, or either the PLL control signal PLLON or the PLL standby signal PLLSB is made high, for example, the PLL circuit is selectively put in the operating state to perform control on the clock signal multiplication mentioned above. In other words, the operation of the PLL circuit is selectively halted when both the PLL control signal PLLON and the PLL standby signal PLLSB are made low. Consequently, the operation of the PLL circuit may be halted in the low-speed operation mode to reduce the consumption of the power otherwise wasted, thereby realizing a relatively low power consumption of the microprocessor as a whole.

The multiplexer MUX3 is supplied with a clock enable signal CKEN and a select control signal COSEL1 from the clock controller CKC. The multiplexer MUX4 is supplied with a select control signal COSEL2 from the clock controller CKC. The clock enable signal CKEN is normally high and, when the microprocessor is switched from the low-speed operating mode to the high-speed operating mode, is temporarily made low, but not necessarily limited thereto. The select control signal COSEL1 is made low when the microprocessor is put in the low-speed operating mode and made high when the microprocessor is put in the high-speed operating mode. The select control signal COSEL2 is selectively made high when switching the frequencies of a system clock signal cks for some reason, the system clock signal cks to be described later.

The multiplexer MUX3 selects the clock pulse ck1 outputted from the divider DIV1 when the clock enable signal CKEN is high and the select control signal COSEL1 is low and supplies the selected clock pulse ck1 as a system clock signal CK1 (a first system clock signal) to a first internal circuit including the central processing unit CPU. When the clock enable signal CKEN is high and the select control signal COSEL1 is high, the multiplexer MUX3 selects the clock pulse DV1 outputted from the PLL circuit to supply the selected clock pulse to the central processing unit CPU as the system clock signal CK1. It should be noted that, when the clock enable signal CKEN is low, the output of the multiplexer MUX3 is fixed to the low level. As a result, at switching from the low-speed operating mode to the high-speed operating mode, the system clock signal CK1 is temporarily halted, thereby stabilizing the operation of the CPU and other components at the time of mode switching.

When the select control signal COSEL2 is made low, the multiplexer MUX4 selects the clock pulse ck1 outputted from the divider DIV1 and supplies the selected clock pulse ck1 as the system clock signal cks (a second system clock signal) to a second internal circuit including a bus controller BSC. When the select control signal COSEL2 is made high, the multiplexer MUX4 selects the clock pulse ckr outputted from the multiplexer MUX1 to supply the selected clock pulse ckr to the bus controller BSC and the like. It should be noted that, in the normal operation, when select control signal COSEL2 is low and the system clock signal cks has the lowest frequency in accordance with the output of the divider DIV1, or the clock pulse ck1.

As mentioned above, the output of the PLL circuit, or the clock pulse DV1 has the frequency that is an integral multiple of the frequency of the output of the multiplexer MUX1, or the clock pulse ckr. The frequency of the output of the divider DIV1, or the clock pulse ck1 is a half of the clock pulse ckr. Consequently, in the low-speed operating mode, the first internal circuit including the central processing unit CPU operates according to the clock pulse ck1 having the lowest frequency, requiring a relatively low power consumption; in the high-speed operating mode, the first internal circuit operates according to the clock pulse DV1 having the highest frequency, requiring a relatively high power consumption. It will be apparent that, in the high-speed operating mode, the frequency of the system clock signal CK1 is high, so that the processing performance of the CPU and other components is enhanced, thereby permitting the high-speed processing suitable for the character recognition and the like on a portable information terminal.

Referring to FIG. 2, there is shown a block diagram illustrating one preferred embodiment of the PLL circuit included in the clock pulse generator CPG of FIG. 1. In FIG. 2, the reference frequency input REF and the oscillation input OSC are supplied to a phase comparator that forms an up signal /UP and a down signal /DOWN (the symbol for each active low signal, or inverted signal is preceded with a slash herein) in accordance with a phase difference between the REF and the OSC. These control signals formed by the phase comparator are supplied to a low-pass filter (or loop filter) comprising a charge pump to be converted to a control voltage VCNT. The control voltage VCNT is supplied to a voltage-controlled oscillator to control a frequency thereof. Output signals P1 and P2 of the voltage-controlled oscillator are divided by a ½ divider to provide the clock pulses DV1. It should be noted that the operations of the low-pass filter and the voltage-controlled oscillator are selectively halted by the control signal supplied to the control pin PLLON; namely, the operation of the PLL circuit is selectively halted.

FIG. 3 (A) illustrates circuit diagram of one preferred embodiment of the voltage-controlled oscillator included in the PLL circuit of FIG. 2. As shown in the figure, the control voltage VCNT is applied to the gate of a n-channel MOSFET Q30 whose source is grounded. By this MOSFET Q30, voltage-current conversion is performed. Namely, the control voltage VCNT is converted to a current corresponding to the potential of the VCNT. A current signal formed by the n-channel MOSFET Q30 is supplied, via a current mirror circuit composed of p-channel MOSFETs Q31 and Q32, to a p-channel MOSFET connected in series to a p-channel MOSFET that constitutes an inverter circuit of a ring oscillator together with an n-channel MOSFET. At the same time, the current signal is also supplied to a diode-connected n-channel MOSFET 34. Of the MOSFETs constituting the above-mentioned inverter, the n-channel MOSFET is connected in series with an n-channel MOSFET that constitutes a current mirror circuit with the above-mentioned diode-connected n-channel MOSFET. This setup flows a current according to the potential of the control voltage VCNT through the inverter constituting the ring oscillator as its operating current. Therefore, when the potential of the control voltage VCNT rises, the operating current of the inverter increases to shorten a signal propagation delay time in each inverter constituting the ring oscillator of the voltage-controlled oscillator, thereby raising the oscillation frequency. Conversely, when the potential of the control voltage VCNT lowers, the operating current of the inverter decreases to elongate the signal propagation delay time, thereby lowering the oscillation frequency.

Gates circuits G30 and G31 are inserted in the ring oscillator of the voltage-controlled oscillator. The gates of the circuits G30 and G31 are closed by the control signal coming from the control pin PLLON to halt the oscillating operation. To halt the oscillating operation, the n-channel MOSFET Q33 is turned on, the control voltage VCNT is forced to the circuit ground potential, and the operating current is shut off.

FIG. 3(B) shows a circuit diagram of the ½ divider contained in the PLL circuit of FIG. 2. In the present embodiment, an output signal P1 of the voltage-controlled oscillator of FIG. 3 (A) and its inverted signal are formed by the inverters to be used as pulse signals. These pulse signals used as a clock pulse for a master/slave flip-flop circuit in which an output signal of a slave latch is fed back to an input of a master latch. The output signals of the master latch and the slave latch are used as divided-by-two clock pulse signals DV2 and DV1. The output signals of the PLL circuit and the divider DIV1 of the clock pulse generator CPG are actually composed of the two-phase clock pulses DV1 and DV2 and ck1 and ck2 being in a predetermined phase relationship. However, for the convenience of description, the clock pulses DV1 and ck1 are mainly used herein.

Figure 4A:
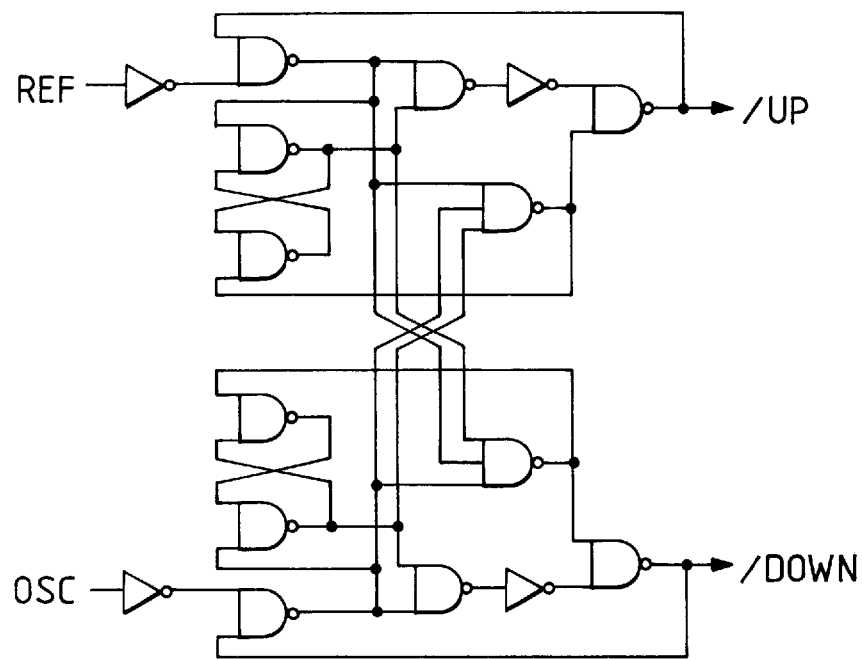
FIGS. 4(A) and (B) are other partial diagrams illustrating one preferred embodiment of the PLL circuit of FIG. 2.

FIG. 4(A) shows a circuit diagram of one preferred embodiment of the phase comparator contained in the PLL circuit of FIG. 2. As shown in FIG. 4(A), the phase comparator identifies a phase difference between the reference frequency input REF and the oscillation input OSC to selectively form the up signal /UP and the down signal /DOWN having a pulse width corresponding to the phase difference. Namely, if the frequency of the oscillation input OSC is lower than the frequency of the reference frequency input REF, the up signal /UP having a pulse width corresponding to the frequency difference (phase difference) is formed. Conversely, if the frequency of the oscillation input OSC is higher than the reference frequency input REF, the down signal /DOWN having a pulse width corresponding to the frequency difference (phase difference) is formed.

Figure 4B:
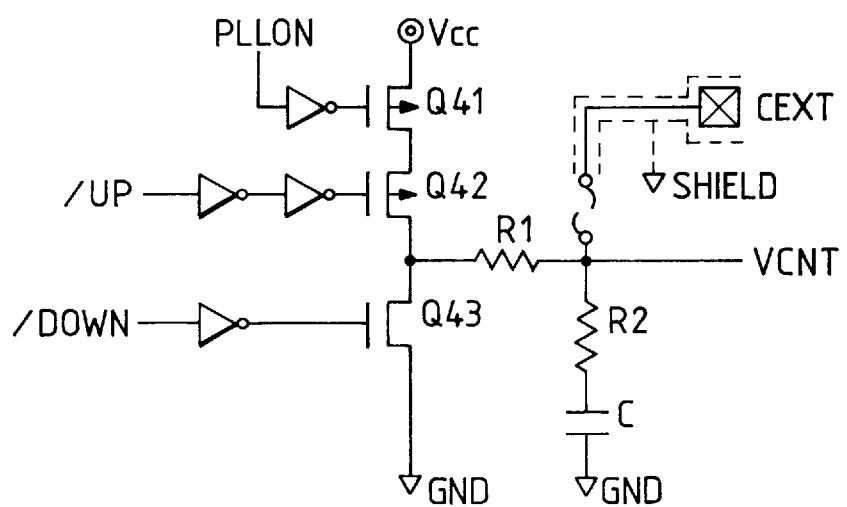

FIG. 4(B) shows a circuit diagram of one preferred embodiment of the charge pump and the low-pass filter of the PLL circuit of FIG. 2. As shown in FIG. 4 (B), a p-channel MOSFET Q41 is turned on by the control signal coming from the control pin PLLON to enable the operation of the low-pass filter. Another p-channel MOSFET Q42 connected in series to the p-channel MOSFET Q41 is supplied with the up signal /UP via two inverters connected in series. A charging current flows to a capacitor C via the two p-channel MOSFETs and resistors R1 and R2. The capacitor C is also supplied with a discharging current via the resistors R1 and R2 and an n-channel MOSFET Q43. The gate of the n-channel MOSFET Q43 is supplied with the down signal /DOWN after inverted by the inverter.

The above-mentioned setup charges the capacitor C only while the up signal /UP is low, so that the potential of the control voltage VCNT is raised in accordance with the phase difference between the reference frequency input REF and the oscillation input OSC. The capacitor C is discharged only while the down signal /DOWN is low, so that the potential of the control voltage VCNT is lowered in accordance with the phase difference between the reference frequency input REF and the oscillation input OSC. It should be noted that a pin CEXT is adapted to connect an externally attached capacitor, not shown, to lower a cutoff frequency of the low-pass filter.

Figure 5A:
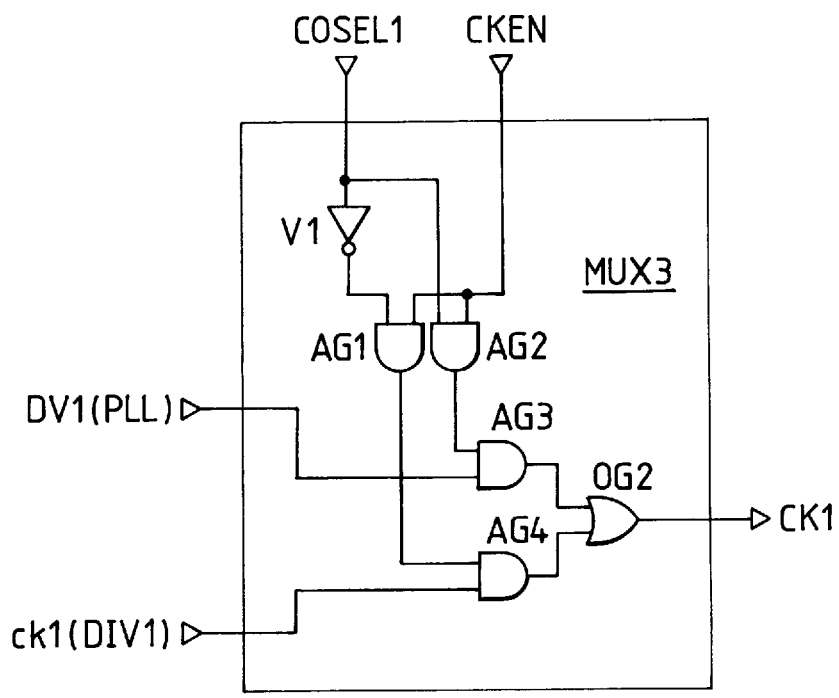
FIGS. 5(A) and (B) are circuit diagrams illustrating one preferred embodiment of two types of multiplexers included in the microprocessor of FIG. 1.

FIG. 5(A) shows a circuit diagram of one preferred embodiment of the multiplexer MUX3 contained in the clock pulse generator CPG of FIG. 1. As shown in FIG. 5(A), the multiplexer MUX3 contains AND gates AG3 and AG4 that receive, at one input pin each thereof, the output signal of the PLL circuit, or the clock pulse DV1 and the divided output of the divider DIV1, or the clock pulse ck1, respectively. The other input pin of the AND gate AG3 is supplied with an output signal of an AND gate AG2 whose pair of input pins are supplied with the clock enable signal CKEN and the select control signal COSEL1. The other input pin of the AND gate AG4 is supplied with an output signal of an AND gate AG1 whose pair of input pins are supplied with the clock enable signal CKEN and an inverted signal of the select control signal COSEL1, the inverted signal formed by an inverter V1. An output of the AND gate AG3 is supplied to one input pin of an OR gate OG2 and an output signal of the AND gate AG4 is supplied to the other input pin of the OR gate OG2.

Thus, when the clock enable signal CKEN is high and the select control signal COSEL1 is low, the multiplexer MUX3 selects the divided output of the divider DIV1, namely the relatively low-frequency clock pulse ck1 to provide the system clock signal CK1. When the clock enable signal CKEN is high and the select control signal COSEL1 is high, the multiplexer MUX3 selects the output of the PLL circuit, namely the relatively high-frequency clock pulse DV1 to provide the system clock signal CK1. As a result, the processing speeds of the microprocessor are selectively switched between, realizing the low-speed and high-speed operating modes.

Figure 5B:
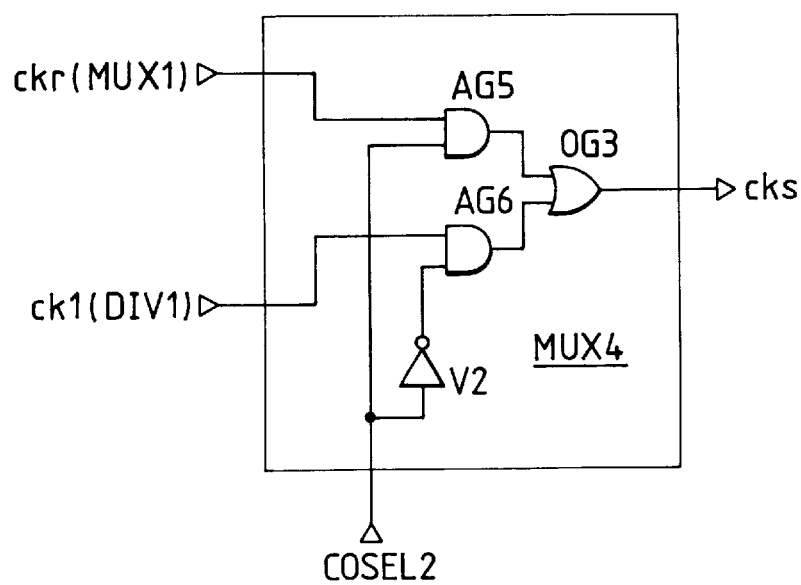

FIG. 5(B) shows a circuit diagram of one preferred embodiment of the multiplexer MUX4 contained in the clock pulse generator CPG of FIG. 1. It should be noted that the multiplexers MUX1 and MUX2 are similar to the MUX4 in circuit arrangement.

As shown in FIG. 5(B), the multiplexer MUX4 includes AND gates AG5 and AG6 that receive, at one input pin each thereof, the output of the multiplexer MUX1, or the clock pulse ckr and the output of the divider DIV1, or the clock pulse ck1 as well as an OR gate OG3 whose pair of input pins receive the output signals of the AND gates AG5 and AG6. The other input pin of the AND gate AG5 is supplied with the select control signal COSEL2 and the other input pin of the AND gate AG6 is supplied with an inverted signal of the COSEL2, the inverted signal being formed by an inverter V2.

Thus, when the select control signal COSEL2 is high, the multiplexer MUX4 selects the clock pulse ckr outputted from the multiplexer MUX1 to provide the system clock signal cks. When the select control signal COSEL2 is low, the multiplexer MUX4 selects the clock pulse ck1 outputted from the divider DIV1 to provide the system clock signal cks. As described before, the select control signal COSEL2 is normally low and the system clock signal cks is formed according to the clock pulse ck1 having the lowest frequency.

Figure 6:
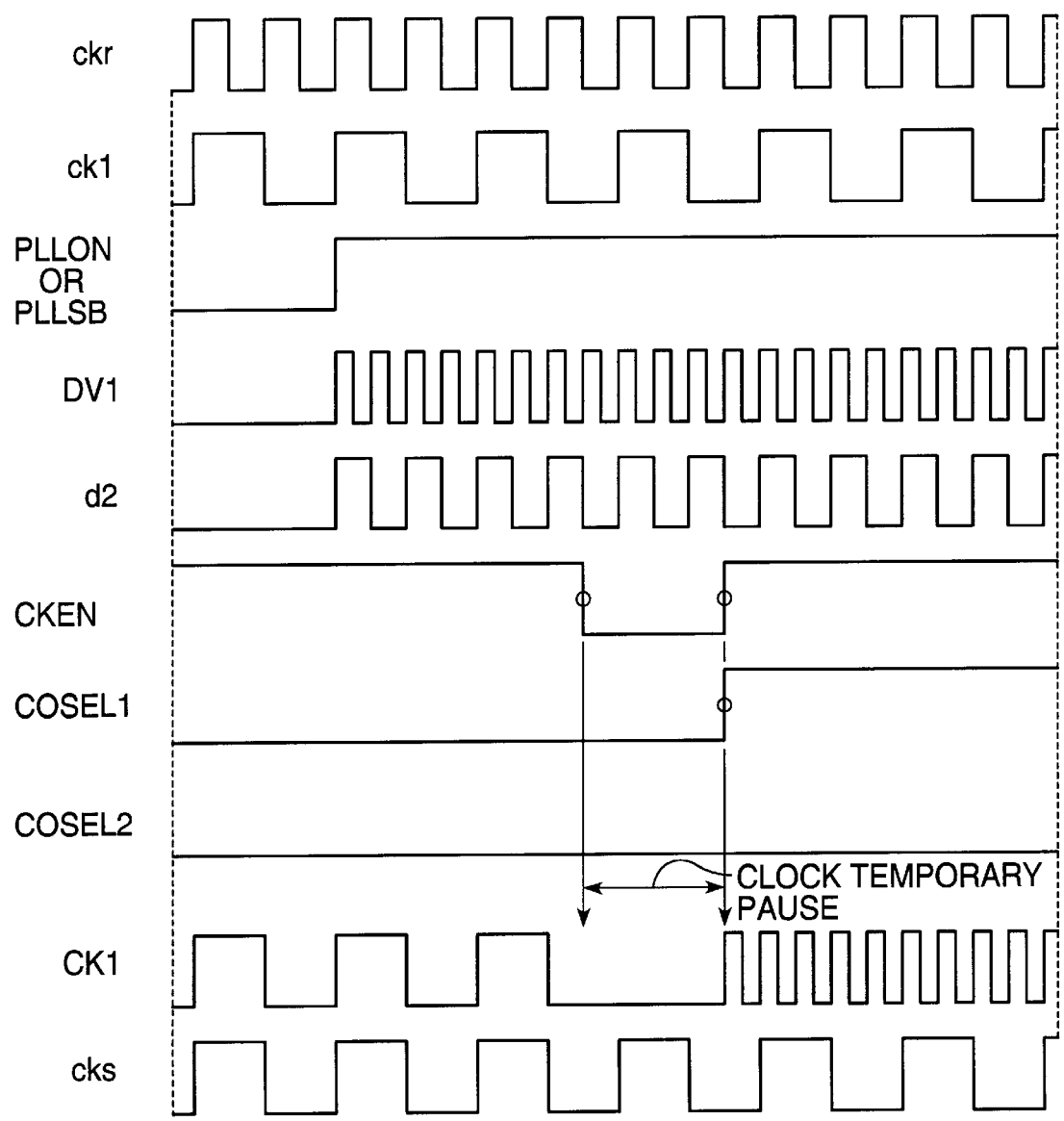
FIG. 6 is a signal waveform diagram illustrating the preferred embodiment of the clock pulse generator of FIG. 1.

Referring to FIG. 6 there is shown a signal waveform of the embodiment of the clock pulse generator CPG of FIG. 1. As shown in FIG. 6, the clock pulse ckr to be supplied to the reference frequency input pin REF of the PLL circuit is a pulse signal having a relatively low frequency in accordance with the natural oscillation frequency of the crystal resonator connected to the external pins XTAL and EXTAL. The divided output of the divider DV1, or the clock pulse ck1 is a pulse signal having a frequency one half of the clock pulse ckr. When the PLL operation control signal PLLON or the PLL standby signal PLLSB is made high, the PLL circuit is selectively put in the operating state to generate the clock pulse DV1 having a frequency that is an integral multiple of the clock pulse ckr, for example two times the ckr. The clock pulse DV1 is divided by two for example by the divider DIV2 to provide a divided output d2, which is supplied to the oscillation input pin OSC of the PLL circuit.

Thus, the divided output d2 supplied to the oscillation input pin OSC of the PLL circuit has generally the same frequency as the clock pulse ckr supplied to the reference frequency input pin REF, and the clock pulse DV1 has a frequency four times as high as the clock pulse ck1. It should be noted that, in FIG. 6, the clock pulse DV1 having the stable frequency is outputted immediately after the PLL operation control signal PLLON or the PLL standby signal PLLSB is made high; actually, however, relatively a long time is required from the activation of the PLL circuit to the stabilization of the frequency of the output signal of the PLL circuit, or the clock pulse DV1.

As described earlier, when the clock enable signal CKEN is made high and the select control signal COSEL1 is made low, the multiplexer MUX3 selects the clock pulse ck1 having the lowest frequency to provide the system clock signal CK1. On the other hand, when the clock enable signal CKEN is made high and the select control signal COSEL1 is made high, the multiplexer MUX3 selects the clock pulse DV1 to provide the system clock CK1. As a result, in the high-speed operating mode, the frequency of the system clock signal CK1 is, for example, four times as high as the frequency in the low-speed operating mode.

Meanwhile, in the present embodiment, the clock enable signal CKEN is temporarily made low before switching from the low-speed operating mode to the high-speed operating mode. When the clock enable signal CKEN is made low, the output signal of the multiplexer MUX3, or the system clock signal CK1 is fixed to the low level, being put in the so-called clock halt state. As a result, a hazard noise of the system clock signal CK1 caused by the clock switching is eliminated to stabilize the operation at mode switching of the first internal circuit including the CPU, in turn stabilizing the operation of the microprocessor and, moreover, the operation of the entire system containing the microprocessor.

Figure 7:
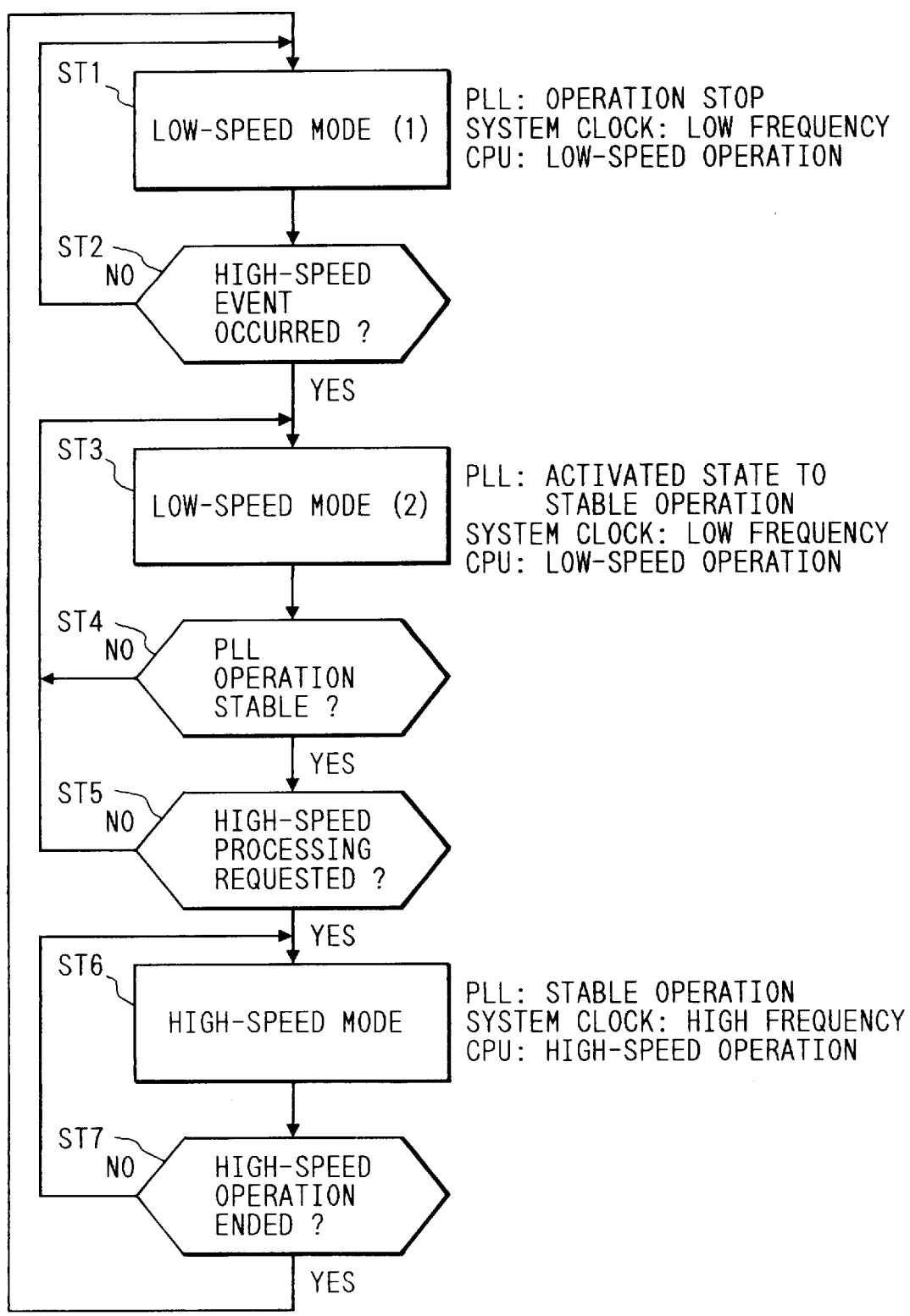
FIG. 7 is a flowchart describing the operation of the clock pulse generator of FIG. 1.

FIG. 7 is an example of a flowchart describing the operation of the clock pulse generator CPG of FIG. 1. When the microprocessor is in the low-speed operating mode (1) in step ST1, both the PLL control signal PLLON and the PLL standby signal PLLSB are low and the voltage-controlled oscillator and the low-pass filter of the PLL circuit are inactive. In this state, the operation of the PLL circuit is stopped, thereby preventing the current consumption except for a lead current. At this time, the system clock signals CK1 and cks having relatively low frequencies formed from the oscillation pulse of the oscillator XOSC and the divided signal (clock pulse ck1) of the pulse (clock pulse ckr) supplied from the external pin EXTAL are supplied to the microprocessor. Consequently, the CPU and other components operate in the low-speed operating mode, thereby saving the power to the microprocessor as a whole.

Next, in step ST2, if the occurrence of an event that requires the high-speed processing of the microprocessor is recognized (Yes), the high-level PLL standby signal PLLSB is outputted from the clock controller CKC in step ST3, thereby activating the PLL circuit. In step ST4, it is determined whether the frequency of the output signal of the PLL circuit has been stabilized. If the frequency has been found stabled, then, in step ST5, it is determined whether a high-speed processing start request has been made. It will be understood that, until the frequency of the PLL circuit output signal is stabilized, the PLL circuit remains in the low-speed operating mode (2), or in the activated state, and continues this state up to the point at which the high-speed processing start request is made. During such a state, the select control signal COSEL1 is kept low and the multiplexer MUX3 continues outputting the system clock signal CK1 for low-speed processing formed from the clock pulse ck1. Therefore, the CPU and other components continue operating in the low-speed operating mode, but if an abnormal condition occurs on the system or a data processing request occurs to be processed before the high-speed processing to be performed, the request operation can be readily performed, thereby taking measures against unpredictable conditions.

If the high-speed processing start request is recognized in step ST5, the select control signal COSEL1 is made high by the clock controller CKC (FIG. 8) in step ST6, upon which the system clock signal CK1 consisting of the clock pulse DV1 of relatively high frequency is supplied to the first internal circuit including the CPU. This puts the microprocessor in the high-speed operating mode, upon which the CPU and other components start the high-speed processing. Lastly, when the end of the high-speed processing is recognized in step ST7, the microprocessor goes back to the low-speed operating mode (1).

It should be noted that, if the high-speed processing start request is made before the stabilization of the PLL circuit operation is confirmed in step ST4, the request is kept in the wait state until the output frequency of the PLL circuit is stabilized. In the present embodiment, the clock enable signal CKEN is temporarily made low before the select control signal COSEL1 is made high as described earlier, putting the system clock signal CK1 temporarily in the clock halt state; however, because this state continues only a very short time, the probability that the CPU fails to take measures against an unpredictable condition is extremely low.

Figure 8:
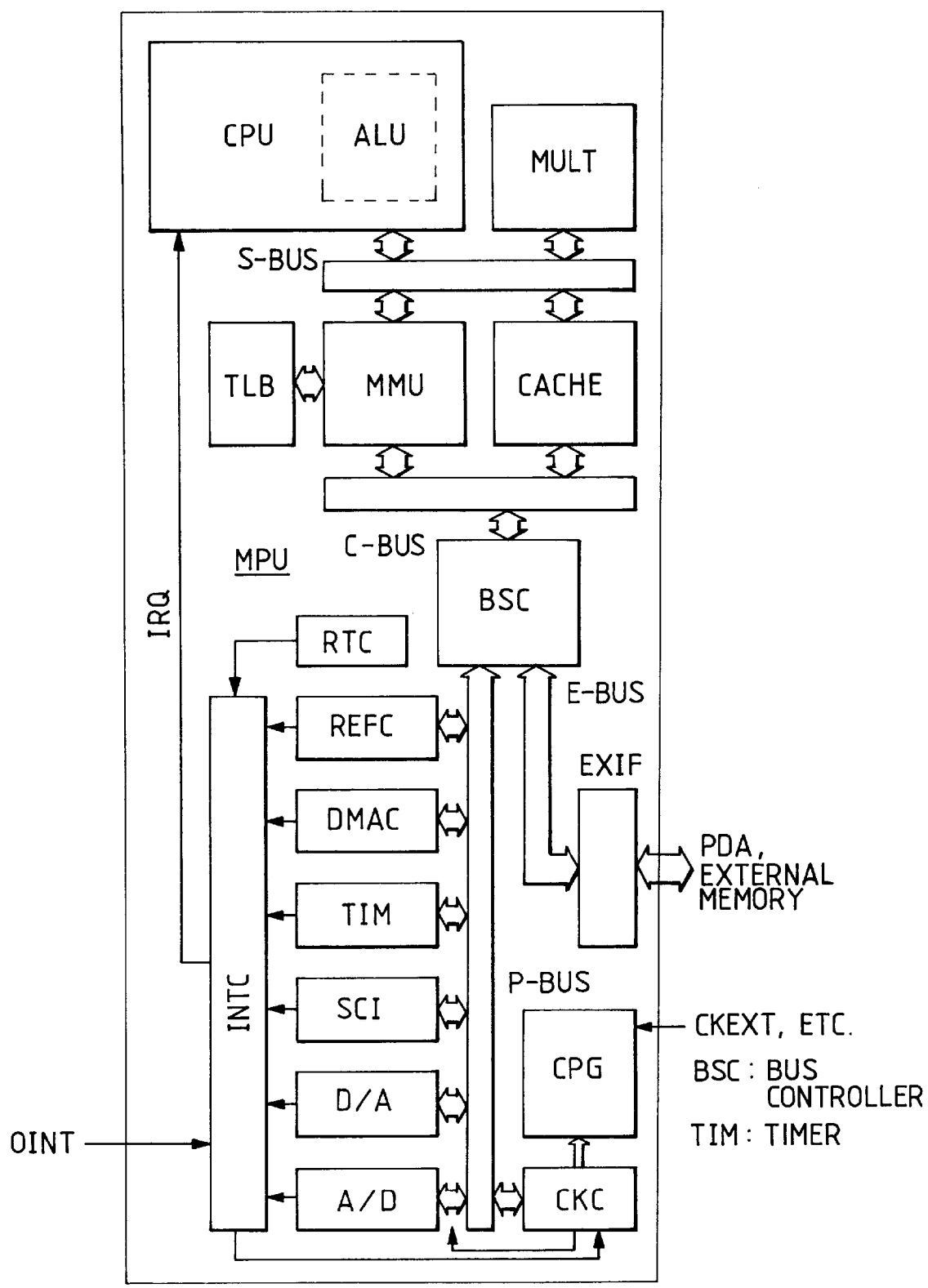
FIG. 8 is system configuration diagram illustrating one preferred embodiment of the microprocessor including the clock pulse generator of FIG. 1.
Figure 9:
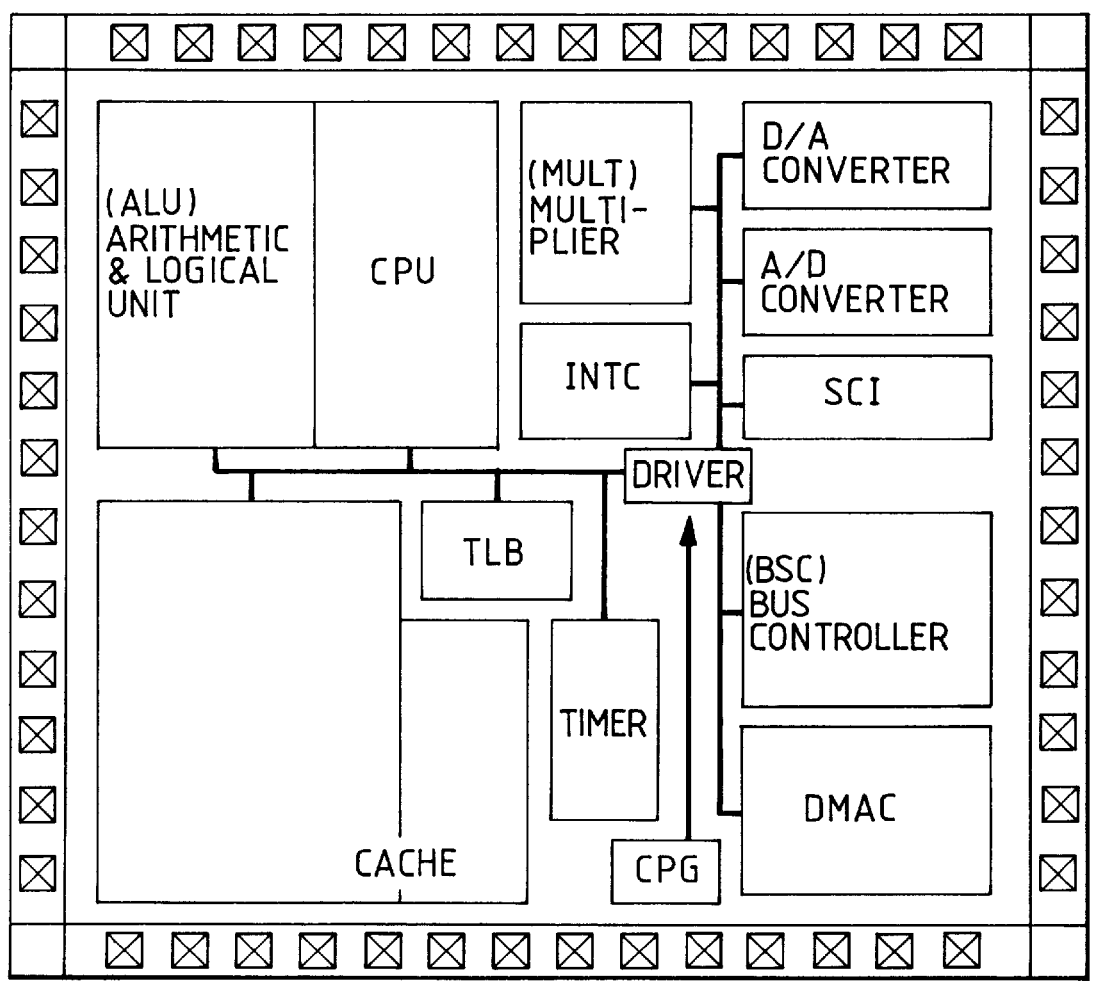
FIG. 9 is a substrate layout diagram illustrating the preferred embodiment of the microprocessor of FIG. 8.

Referring to FIG. 8, there is shown a system constitution diagram illustrating one preferred embodiment of the microprocessor MPU incorporating the clock pulse generator CPG. FIG. 9 shows a layout of the microprocessor MPU on a semiconductor substrate. As shown in FIG. 8, the microprocessor MPU has its main component the central processing unit CPU including an arithmetic and logic unit ALU based on stored programming. The CPU is connected with a multiplier MULT, a memory management unit MMU, and a cache memory CACHE via a system bus S-BUS. The memory management unit MMU is connected with an address translation table TLB. The memory management unit MMU and the cache memory CACHE are also connected, at the other ends thereof, to a cache bus C-BUS which is connected with a bus controller BSC.

The bus controller BSC is connected, at the other end thereof, with a peripheral bus P-BUS and an external bus E-BUS. The peripheral bus P-BUS is connected with peripheral unit controllers such as a refresh controller REFC, a direct memory access controller DMAC, a timer circuit TIM, a serial communication interface SCI, a digital/analog converter D/A, and an analog/digital converter A/D. The external bus E-BUS is connected with an external interface EXIF. The refresh controller REFC, the direct memory access controller DMAC, the timer circuit TIM, the serial communication interface SCI, the digital/analog converter D/A, and the analog/digital converter A/D are connected, at the other ends thereof, with an interrupt controller INTC. The interrupt controller INTC is connected with the central processing unit CPU via an interrupt request signal IRQ. The external interface EXIF is connected with a portable information terminal, an external memory or the like.

The interrupt controller INTC is further connected with a real-time clock circuit RTC. The real-time clock circuit RTC is supplied with a clock signal whose frequency is not changed by the control signal shown in FIG. 1. This allows the real-time clock circuit RTC to perform time management not affected by the control signal of FIG. 1. The real-time clock circuit RTC supplies an interrupt signal to the interrupt controller INTC at a predetermined time interval for example, thereby causing an interrupt request to the CPU at a predetermined time interval. Also, the interrupt controller INTC is supplied with an outside interrupt signal OINT. The outside interrupt signal OINT is transmitted to the CPU via the interrupt controller INTC.

The peripheral bus P-BUS is connected with the clock controller CKC, but not necessarily limited thereto. The clock controller CKC has a plurality of registers, which will be described with reference to FIG. 19. The clock controller CKC is connected to the peripheral bus P-BUS to allow the CPU to set control data to these registers or read data therefrom. It will be apparent that the clock controller CKC may be connected to the system bus S-BUS instead of the peripheral bus P-BUS to realize the above-mentioned function. The clock controller CKC forms the above-mentioned signals PLLON, PLLSB, COSEL1, COSEL2, and CKEN according to the data set to the above-mentioned registers. The formed control signals are supplied to the clock pulse generator CPG. In addition, according to the data set to the registers, the clock controller CKC forms a plurality of module enable signals to be described with reference to FIG. 10. In FIG. 8, these module enable signals are represented in one wiring line for convenience of illustration. Similarly, wiring lines connecting the clock pulse generator CPG with the externals pins CKEXT, EXTAL, XTAL, and CKRATE are represented in one wiring line for convenience of illustration.

The central processing unit CPU operates in synchronization with the system clock signal CK1 supplied from the clock pulse generator CPG to perform predetermined arithmetic processing according to a control program read from the cache memory CACHE for example and, at the same time, control and manage the remaining portions of the microprocessor MPU. At this time, the arithmetic and logic unit ALU performs a necessary arithmetic and logic operation and the multiplier MULT performs a necessary multiplication. The memory management unit MMU translates a logic address outputted from the CPU at memory access to a physical address through the address translation table TLB. The cache memory CACHE consists of a high-speed access memory, reads a program or data on a predetermined block basis from a memory installed external to the microprocessor MPU, and holds the read program or data, thus contributing to the high-speed operation of the CPU. The CPU, the MULT, the MMU, and the CACHE are included in the first internal circuit that operates on the system clock CK1 of relatively high frequency.

The bus controller BSC controls the bus access made by the peripheral unit controllers connected to the peripheral bus P-BUS and, at the same time, controls the operations of these peripheral unit controllers. On the other hand, the refresh controller REFC, one of the peripheral unit controllers, controls a refresh operation of a dynamic RAM (Random Access Memory) provided as an external memory. The direct memory access controller DMAC supports high-speed data transfer between the external memory and the cache memory CACHE for example. The timer circuit TIM supports time management necessary for the central processing unit CPU. The serial communication interface SCI supports serial data transfer with an external communication controller or the like. The analog/digital converter A/D converts an analog signal supplied from an external sensor or the like into a digital signal of the predetermined number of bits. The digital/analog converter D/A converts a digital signal outputted from the CPU into a predetermined analog signal and outputs the resultant analog signal to the outside.

The interrupt controller INTC selectively receives interrupt requests from the peripheral unit controllers in a predetermined priority and transmits the received interrupt to the CPU as an interrupt request signal IRQ. The external interface EXIF controls and manages data transfer between the microprocessor MPU and an externally connected portable information terminal PDA and the external memory or the like, thereby providing interface between the MPU and these external devices. The bus controller BSC and the peripheral unit controllers are included in the second internal circuit that operates in synchronization with the system clock signal cks of relatively low frequency.

In the present embodiment, each of the portions constituting the microprocessor MPU is formed on one semiconductor substrate in a predetermined layout as shown in FIG. 9. Each portion is made modular and selectively formed according to user specifications. The microprocessor MPU of the present embodiment has a clock switch provided for each module as will be described later. The system clock signals CK1 and cks outputted from the clock pulse generator CPG are supplied to each module via a clock driver and then via the clock switch that is selectively turned on by the valid level of a corresponding module enable signal. As a result, each module is selectively enabled as required, thereby further saving the power to the microprocessor MPU.

Figure 10:
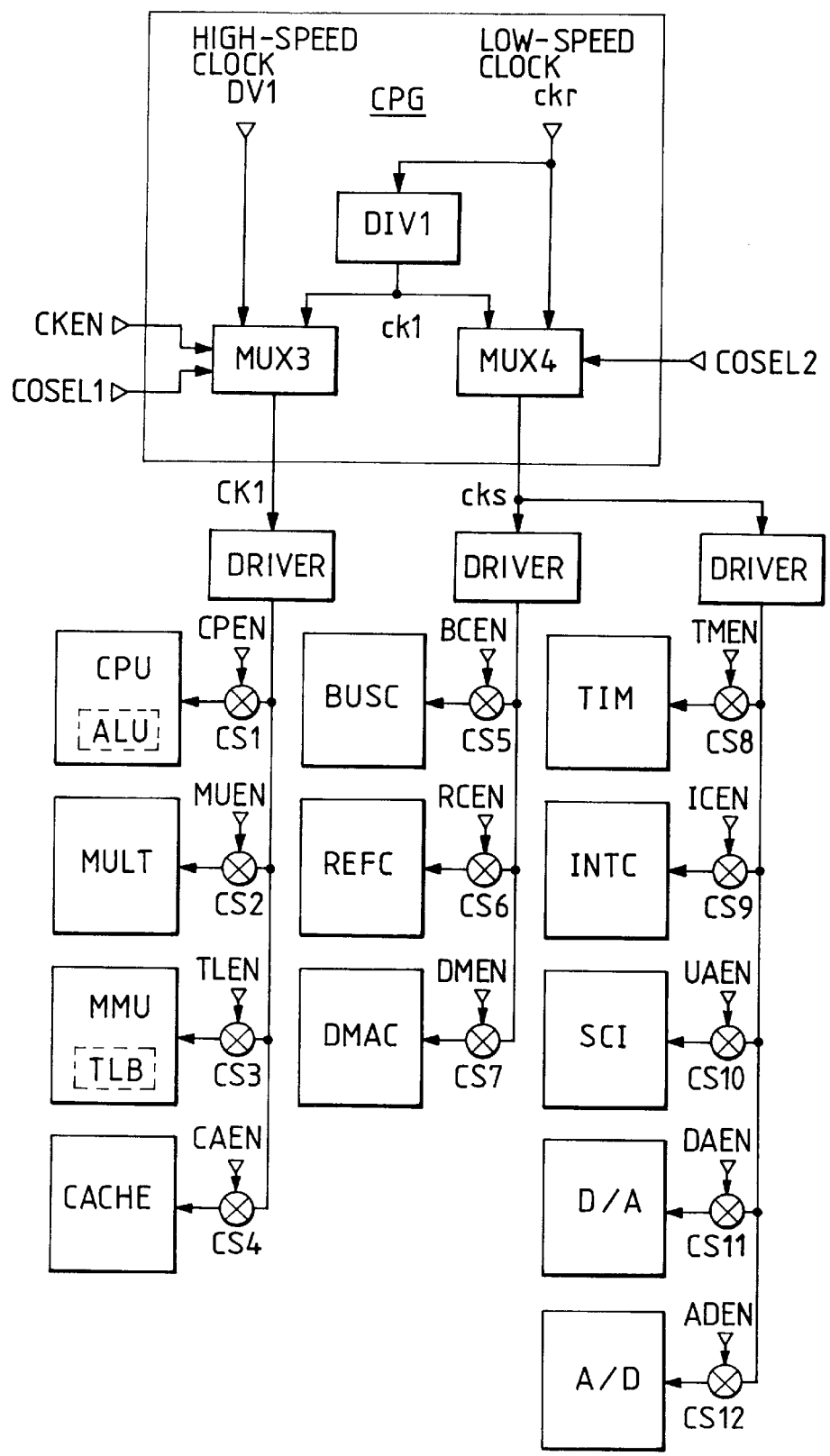
FIG. 10 is a connection diagram illustrating one preferred embodiment for describing a clock supplying path of the microprocessor of FIG. 8.

FIG. 10 shows one preferred embodiment of a clock supply path in the microprocessor MPU of FIG. 8. As shown in FIG. 10, the system clock signal CK1 of relatively high frequency outputted from the multiplexer MUX3 in the clock pulse generator CPG is supplied to the central processing unit CPU, the multiplier MULT, the memory management unit MMU, and the cache memory CACHE included in the first internal circuit via the predetermined clock driver and then via clock switches CS1 through CS4. The clock switch CS1 is selectively put in the conductive state by the high level of a module enable signal CPEN. The clock switches CS2, CS3 and CS4 are selectively put in the conductive state by the high levels of module enable signals MUEN, TLEN, and CAEN respectively. Thus, the central processing unit CPU, the multiplier MULT, the memory management unit MMU, and the cache memory CACHE are selectively enabled by the high levels of the corresponding module enable signals. It should be noted that the clock switch CS1 put in the non-conductive state by the module enable signal CPEN is put in the conductive state again by an external reset signal or an external interrupt signal, not shown.

Next, the system clock signal cks of relatively low frequency outputted from the multiplexer MUX4 in the clock pulse generator CPG is supplied to the bus controller BSC, the refresh controller REFC, and the direct memory access controller DMAC of the second internal circuit via a predetermined clock driver and the via clock switches CS5 through CS7. The system clock signal cks is supplied to the timer circuit TIM, the interrupt controller INTC, the serial communication interface SCI, the digital/analog converter D/A, and the analog/digital converter A/D of the second internal circuit via another predetermined driver and then via clock switches CS8 through CS12. The clock switches CS5 through CS7 are selectively put in the transmitting state by the high levels of corresponding module enable signals BCEN, RCEN, and DMEN. The clock switches CS8 through CS12 are selectively put in the conductive state by the high levels of corresponding module enable signals TMEN, ICEN, UAEN, DAEN, and ADEN. As a result, the bus controller BSC, the refresh controller REFC, the direct memory access controller DMAC, the timer circuit TIM, the interrupt controller INTC, the serial communication interface SCI, the digital/analog converter D/A, and the analog/digital converter A/D are selectively enabled by the high levels of the corresponding module enable signals.

Thus, by making modular each portion of the microprocessor MPU and selectively supplying the system clock signal CK1 or cks according to the module enable signals, any module not required by the system configuration may be selectively isolated from the configuration and, at the same time, the operation of any module not used according to the contents of the processing by the microprocessor MPU may be stopped, thereby preventing the current consumption from being wasted. In other words, only the modules to be used according to the contents of the processing by the MPU are selectively enabled to save the power to the MPU and, furthermore, the power to an application system based on the MPU.

In addition, even if the clock switch is set to a state in which the system clock signal CK1 (or cks) is supplied to a module by the corresponding module enable signal for example, the frequency of the system clock signal CK1 (or cks) may be altered by the control signal COSEL1 (or COSEL2) as described before, so that the frequency of the system clock CK1 may be lowered by the control signal COSEL1 (or COSEL2) for a processing operation for which the high-speed operations is not required. This also results in the elimination of wasted current consumption.

As described before, the system clock CK1 is formed according to the clock pulse ck1 of relatively low frequency when the microprocessor MPU is put in the low-speed operating mode and the select control signal COSEL1 is made low. When the microprocessor MPU is put in the high-speed operating mode and the select control signal COSEL1 is made high, the system clock signal CK1 is formed according to the clock pulse DV1 having a frequency four times as high. As a result, the speed of the operation of the first internal circuit including the central processing unit CPU is selectively increased or decreased to switch between the processing capabilities of the microprocessor MPU according to an event occurrence condition or the like.

On the other hand, when the microprocessor is switched from the low-speed operating mode to the high-speed operating mode, the clock enable signal CKEN is temporarily made low, upon which the system clock signal CK1 is temporarily put in the clock halt state. This prevents a hazard noise caused by the mode switching from happening, stabilizing the operation of the microprocessor MPU.

Figure 19:
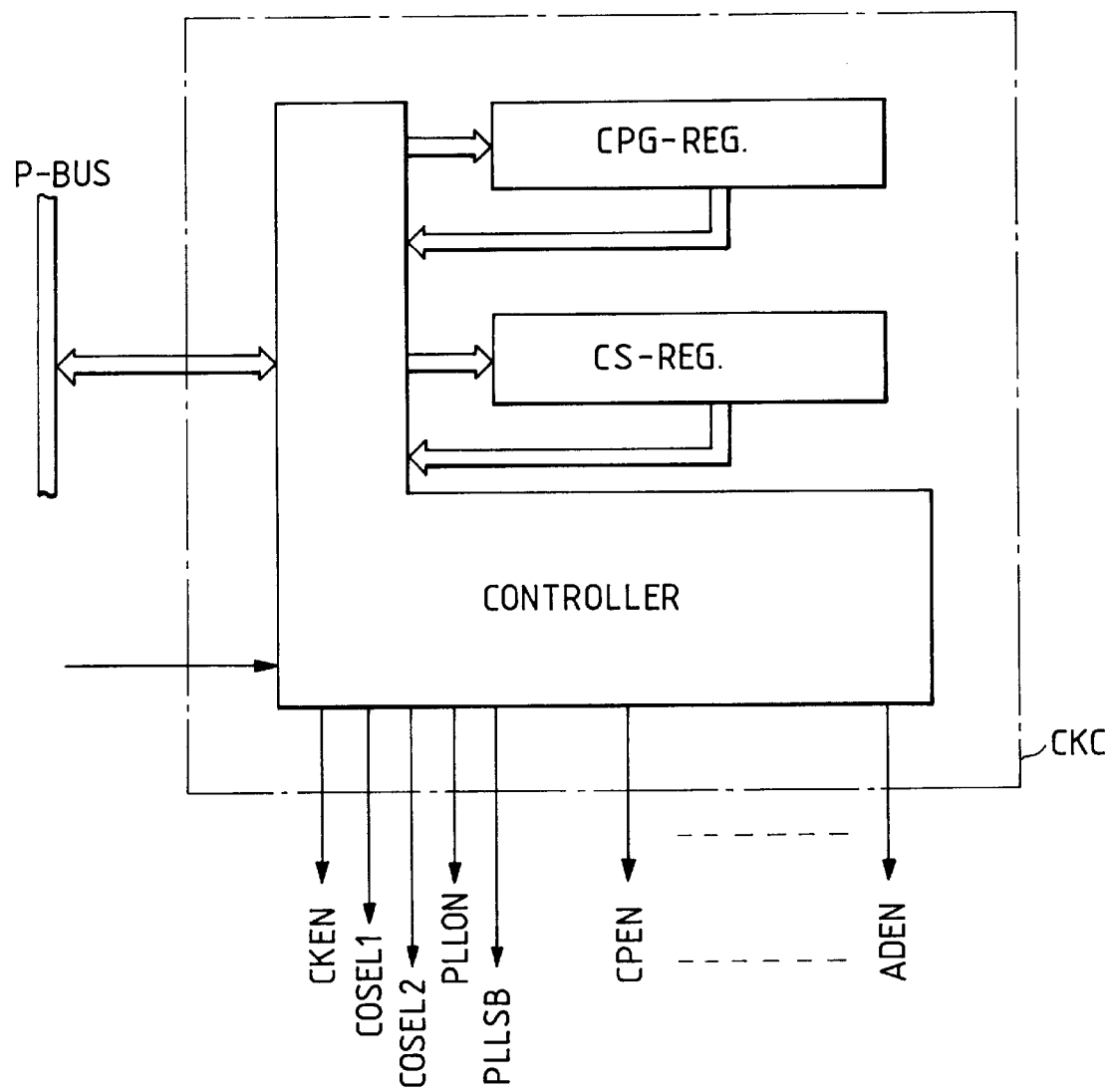
FIG. 19 is a block diagram illustrating one preferred embodiment of the clock controller of the preferred embodiment of FIG. 8.

Next, the constitution of the clock controller CKC will be described with reference to FIG. 19. The clock controller includes a register CPG-Reg. on which control data associated with the control signals PLLON, PLLSB, COSEL1, COSEL2, and CKEN for controlling the clock signal are set, a register CS-Reg. on which control data for controlling the module enable signals CPEN, MUEN, TLEN, CAEN, BCEN, RCEN, DMEN, TMEN, ICEN, UAEN, DAEN, and ADEN are set, and a controller. This controller controls data transfer between the P-BUS and the above-mentioned registers and, at the same time, based on the control data set on the registers, forms the above-mentioned control signals and module enable signals.

An example of the operation of the clock controller CKC will be described. The register CPG-Reg. has bits corresponding to the above-mentioned control signals. Namely, the register CPG-Reg. has a bit (Bon) corresponding to the control signal PLLON, a bit (Bsb) corresponding to the PLLSB, a bit (B11) corresponding to the COSEL1, a bit (B12) corresponding to the COSEL2, and a bit (Ben) corresponding to the CKEN, these bits not shown. Each bit is set with control data associated with a corresponding control signal. For example, the bit (Bsb) is set with control data associated with the control signal PLLSB. The setting of the control data is achieved when the central processing unit CPU specifies the register CPG-Reg. and writes the control data to the corresponding bit in the control register via the P-BUS. For the CPU to specify the control register CPG-Reg., a predetermined address is assigned to the control register, but not necessarily limited thereto. The above-mentioned controller in the CKC forms each of the control signals according to the control data set to each of the bits of the control register CPG-Reg. For example, when the CPU writes control data "1" to the bit (Bon) in the control register, the controller sets the control signal PLLON to the high level. When the CPU writes the control data "0" to the bit (Bon), the controller sets the control signal PLLON to the low level. Likewise, when the CPU writes the control data "1" (or "0") to the bits (Bsb), (B11), (B12), and (Ben), the controller sets the control signals PLLSB, COSEL1, COSEL2, and CKEN to the high level (or the low level) respectively.

The above-mentioned control register CS-Reg. has bits corresponding to the above-mentioned module enable signals. Namely, the CS-Reg. has a bit (Bcp) corresponding to the module enable signal CPEN, a bit (Bmu) corresponding to the MUEN, a bit (Btl) corresponding to TLEN, a bit (Bca) corresponding to CAEN, a bit (Bbc) corresponding to the BCEN, a bit (Brc) corresponding to RCEN, a bit (Bdm) corresponding to the DMEN, a bit (Btm) corresponding to the TMEN, a bit (Bic) corresponding to the ICEN, a bit (Bua) corresponding to the UAEN, a bit (Bda) corresponding to the DAEN, and a bit (Bad) corresponding to the ADEN, these bits not shown. Each of the bits is set with control data associated with the corresponding module enable signal. For example, the bit (Bmu) is set with control data associated with the module enable signal MUEN. The setting of the control data is achieved when the CPU specifies the control register CS-Reg. and writes the control data to the corresponding bit of the CS-Reg. via the P-BUS. For the central processing unit CPU to specify the control register CS-Reg., a predetermined address is assigned to the CS-Reg., but not necessarily limited thereto. The above-mentioned controller in the CKC forms each of the control signals according to the control data set to each of the bits of the control register CS-Reg. For example, When the CPU writes the control data "1" to the bit (Bmu) in the control register CS-Reg., the controller sets the module enable signal MUEN to the high level. When the CPU writes the control data "0" to the bit (Bmu), the controller sets the MUEN to the low level. Likewise, when the CPU writes the control data "1" (or "0") to the bits (Bcp), (Btl), (Bca), (Bbc), (Brc), (Bdm), (Btm), (Bic), (Bua), (Bda), and (Bad), the controller sets the corresponding module enable signals CPEN, TLEN, CAEN, BCEN, RCEN, DMEN, TMEN, ICEN, UAEN, DAEN, and ADEN to the high level (or low level). Upon receiving the control signal from the interrupt controller INTC, the controller in the CKC forcibly resets each of the bits of the control register CS-Reg., but not necessarily limited thereto. By this reset, each of the bits of the CS-Reg. is set to the control data "1" that puts the above-mentioned clock switches in the conductive state.

The writing (or setting) of the control data to each of the bits of the control register CPG-Reg. by the central processing unit CPU is instructed in a program that is executed by the CPU for example. Consequently, depending on the program, the frequencies of the system clock signal in the microprocessor MPU may be switched. In addition, the system clock frequencies may be switched by means of the external pins CKEXT and CKRATE. This setup makes it possible, for example, to set the system clock frequency by means of the external pins CKEXT and CKRATE also before the program is executed (in the initial state after reset for example).

Like the control register CPG-Reg., each of the bits of the control register CS-Reg. is also written (or set) with the control data by the program. Therefore, the supply of the system clock to each module is determined by the program. If an interrupt request or a reset request comes from the outside or an interrupt request comes from the real-time clock RTC, these requests are transmitted by the interrupt controller INTC to the controller in the CKC as the above-mentioned control signals. Therefore, if these requests come, the corresponding clock switches are put in the conductive state to supply the system clock signal to the corresponding modules. This setup restarts the supply of the system clock signal to the central processing unit CPU by the interrupt request (including the reset request) issued from the outside or the interrupt request issued from the real-time clock RTC even if the supply of the system clock signal to the CPU is in the stopped state.

Figure 11A:
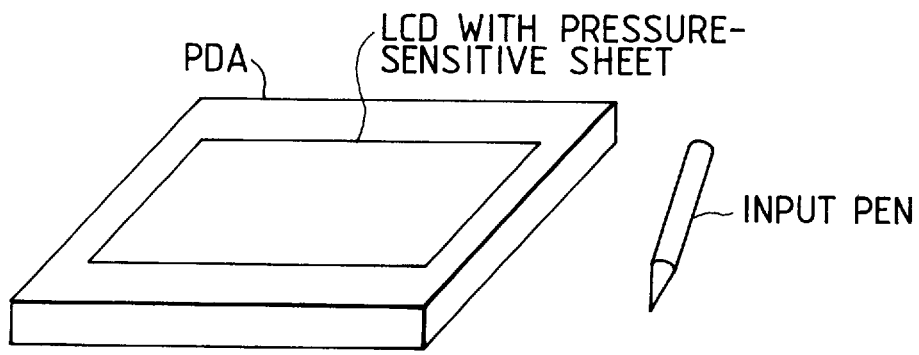
FIGS. 11(A), 11(B) and 11(C) are schematic diagrams illustrating one preferred embodiment of an application example requiring the switching between the processing speed of the microprocessor of FIG. 8.
Figure 11B:
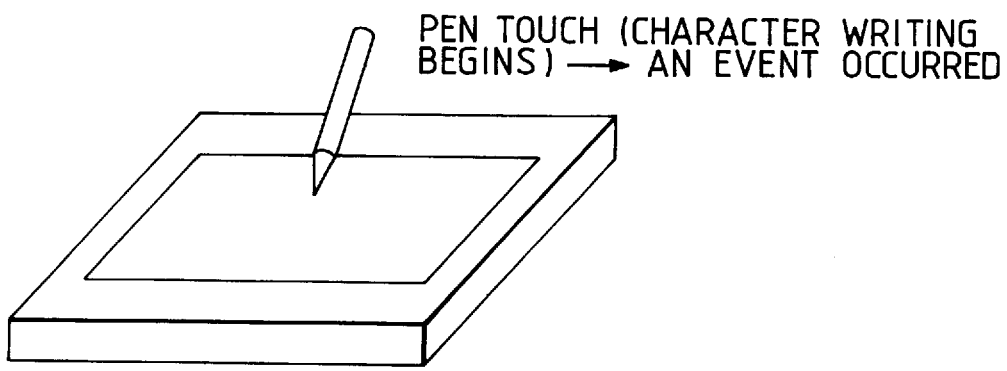
Figure 11C:
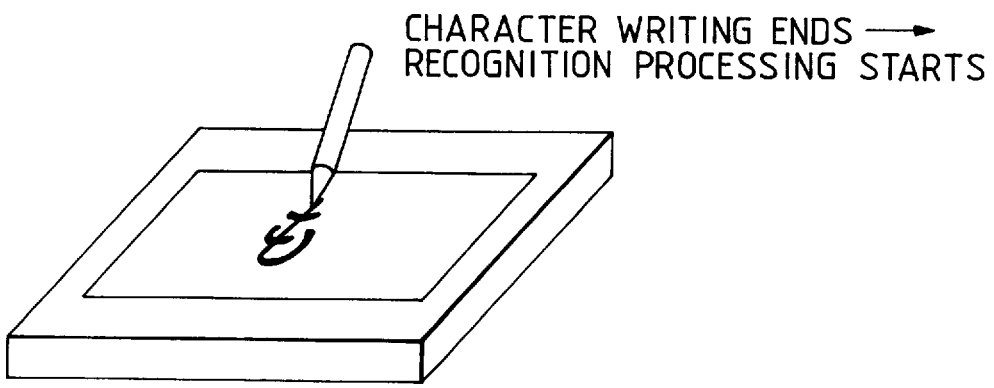

FIGS. 11(A), 11(B), and 11(C) show schematic diagrams illustrating one preferred embodiment of an application that requires the processing speed switching in the microprocessor MPU of FIG. 8. In this embodiment, the microprocessor is for use in a portable information terminal PDA equipped with an input pen and controls the processing of the terminal. The portable information terminal PDA has an LCD (Liquid Crystal Display) covered with a pressure-sensitive sheet. The user writes characters on the LCD covered with the pressure-sensitive sheet by means of the input pen to enter data in the PDA. The input pen is provided with a micro switch, not shown, at its tip for identifying that the pressure-sensitive sheet is being pressed with the input pen. The open/close state of the micro switch is transmitted to the microprocessor MPU via a signal path, not shown. Receiving the open/close signal, the microprocessor MPU knows the input pen state, thereby recognizing the occurrence of an event that requires the high-speed processing and a request for starting the high-speed processing shown in FIG. 7.

Namely, as shown in FIG. 11(A), when the user is not writing a character on the LCD covered with the pressure-sensitive sheet with the input pen placed off the LCD, the micro switch of the input is off, which is recognized by the microprocessor MPU that the portable information terminal PDA is in the standby state. Then, the MPU instructs the clock controller CKC to make low the PLL operation control signal PLLON and the PLL standby signal PLLSB for the clock pulse generator CPG of FIG. 1. At the same time, the MPU instructs the CKC to make high the clock enable signal CKEN and make low the select control signal COSEL1. As a result, the PLL circuit of the clock pulse generator CPG is put in the inoperative state to save its power and, at the same time, the frequency of the system clock signal CK1 is made low to make the first internal circuit including the central processing unit CPU perform the low-speed operation of low power consumption. The above-mentioned instruction to the clock controller CKC is achieved by writing the control data "0" to the bits (Bon), (Bsb), and (B11) and the control data "1" to the bit (Ben) of the control register CPG-Reg. That is, the instruction is achieved by making the central processing unit CPU execute the program that writes the control data.

Next, as shown in FIG. 11(B), when the user starts writing a character by pressing the input pen against the LCD cover with the pressure-sensitive sheet, the micro switch of the input pen is turned on, upon which the MPU recognizes the occurrence of an event that requires high-speed processing. Then, MPU instructs the clock controller CKC to make high the PLL standby signal PLLSB for the clock pulse generator CPG, putting the PLL circuit in the activated state. At this moment, the select control signal COSEL1 is left low as described before to let the first internal circuit including the CPU continue the low-speed operation. The instruction to the clock controller CKC in FIG. 11(B) is achieved by writing the control data "0" to the bits (Bon) and (B11) and the control data "1" to the bits (Bsb) and (Ben) of the control register CPG-Reg. That is, the instruction is achieved by making the central processing unit CPU execute the program that writes the control data. It will be apparent that the instruction may be executed only by the writing to those bits on which the control data is variable.

Then, as shown in FIG. 11(C), when the user has written the character and detaches the input pen from the LCD, the micro switch of the input pen is turned off, upon which the microprocessor MPU recognizes a request for starting the high-speed processing. The MPU instructs the clock controller CKC to temporarily make low the clock enable signal CKEN to be supplied to the clock pulse generator CPG and then make high the select control signal COSEL1. This makes the frequency of the system clock signal four times as high for example, putting the first internal circuit including the CPU in the high-speed operating mode. It will be apparent that the PLL circuit of the clock pulse generator CPG is in the stable state and therefore the CPU can interpret, at the high speed, the character entered by the user based on the character data sent from the LCD covered with the pressure-sensitive sheet. The instruction to the clock controller CKC in FIG. 11(C) is performed in substantial two steps, but not necessarily limited thereto. First, the control data "0" is written to the bit (Ben) of the above-mentioned control register CPG-Reg. Then, the control data "1" is written to the bits (Ben) and (B11) of the CPG-Reg. In the instruction, the control data "1" may also be written to the bit (Bsb) to the same effect. Namely, the instruction is made by making the CPU execute the program that writes the control data in the two steps. It will be apparent that only the writing of the control data to the bit for which the control data is varied may perform the above-mentioned instruction.

As for the system clock signal cks to be supplied to peripheral circuits, its frequency may be changed only by writing the control data to the bit (B12) as mentioned above. Consequently, for the instruction of FIG. 11(A) for example, the control data "0" is written to the bit (B12) of the CPG-Reg; for the instructions of FIGS. 11(B) and(C), the control data "1" is written to the bit (B12) of the CPG-Reg. This makes, in the standby state shown in FIG. 11(A), the frequency of the system clock signal cks be lower than that in the states of FIGS. 11(B) and (C), resulting in the saved power to the peripheral circuits. Obviously, the writing of the control data to the bit (B12) is instructed by the program. Thus, the frequency of the system clock signal cks may be set independently of the system clock signal CK1, so that the frequency of the system clock signal cks may be changed in any times of FIGS. 11(A), 11(B), and 11(C) or may not be changed at all.

Each of the steps ST1, ST3, and ST6 in the operational flow of FIG. 7 is executed by the program that writes the control data to the control register CPG-Reg. as mentioned above. In step ST4, a time from activating the PLL circuit for example to the stabilization thereof is predetermined and this predetermined time is preset to the timer circuit TIM, the real-time clock circuit RTC, and the like. After the control data is written to the control register CPG-Reg. in step ST3, during the predetermined time set to the timer circuit TIM and the like, the program for step ST6 is adapted not to be executed even if the high-speed processing start request in step ST5 for example is made. This setup permits the execution of steps ST4 and ST5. In the above-mentioned state ST7, the program for interpreting the entered character is executed. Upon completion of the execution, the processing goes back to step ST1. Namely, the writing of the control data to the control register CPG-Reg. is performed. Each of steps ST2 and ST5 may be achieved by a program such as making the central processing unit CPU detect the state of the above-mentioned micro switch via the external interface EXIF. Alternatively, an interrupt signal may be adapted to occur when the state of the micro switch changes and, according to this interrupt signal, the interrupt processing program as mentioned above for checking the micro switch state may be prepared to achieve each of steps ST2 and ST5. Thus, the operation flow of FIG. 7 may be achieved by the program to be executed by the CPU.

It should be noted that the time from the activation of the PLL circuit of the clock pulse generator CPG to the stabilization of the frequency of the PLL output is on an order of milliseconds, being sufficiently short as compared with the time between the start and end of the entering a character by the user. Therefore, at the time when the high-speed processing start request is recognized by the microprocessor MPU and the mode switching is performed, the output frequency of the PLL is sufficiently stabilized, causing no wait for the stabilization.

Figure 12A:
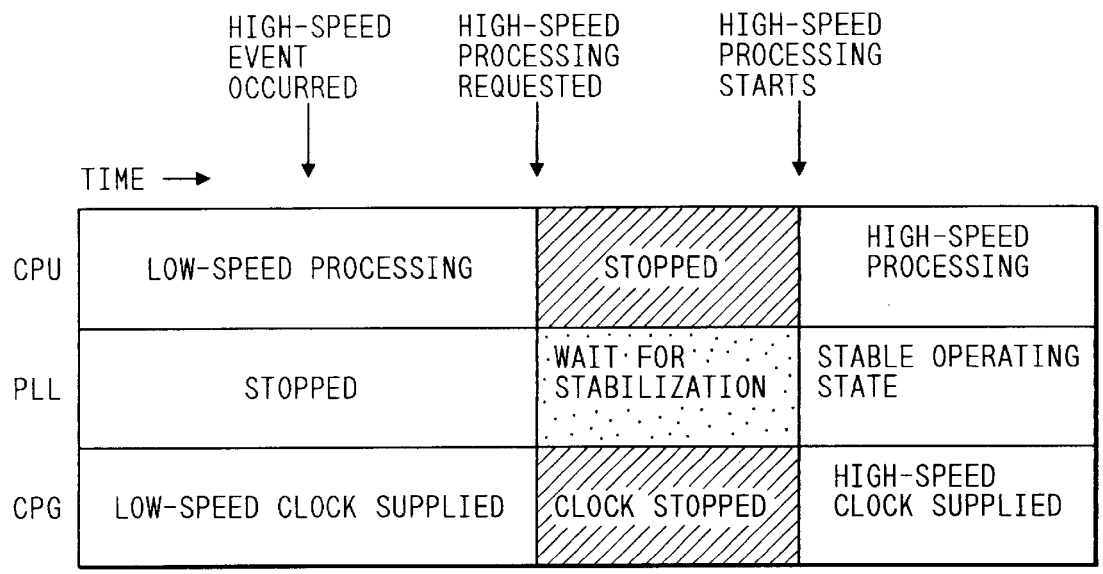
FIGS. 12(A) and 12(B) are schematic diagrams for describing the effects of processing speed switching of the microprocessor of FIG. 8.
Figure 12B:
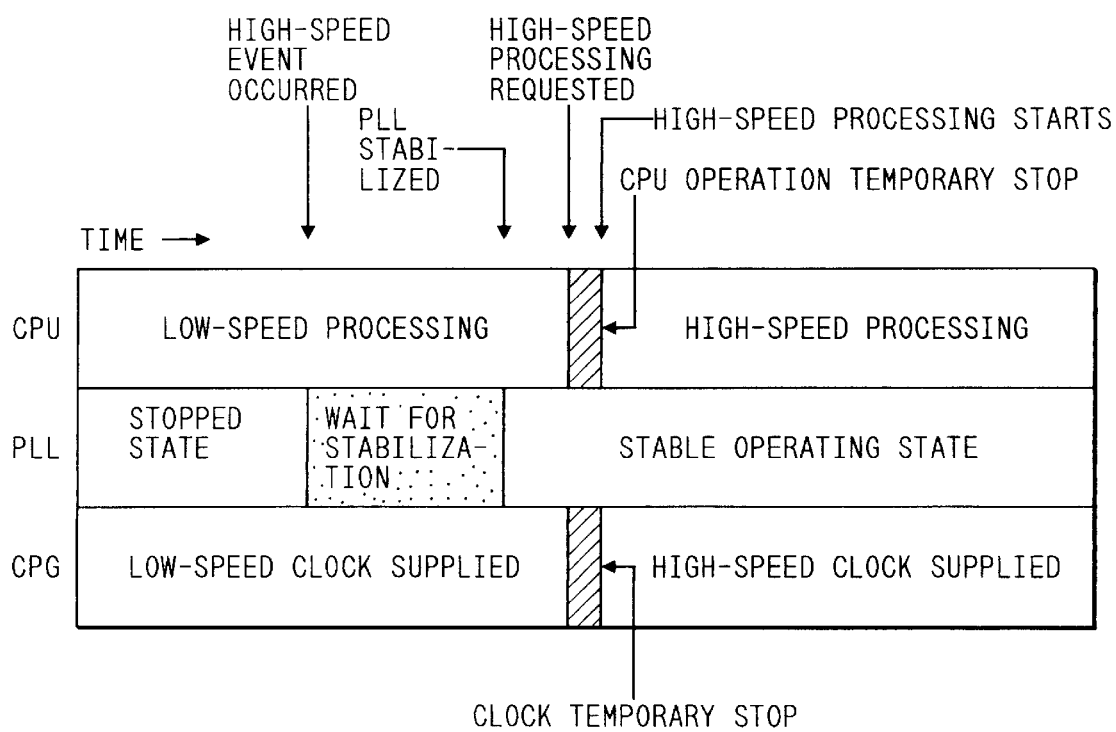

FIGS. 12(A) and 12(B) show schematic diagrams illustrating the effects of the processing speed switching in the microprocessor MPU. For ease of understanding the present invention, FIG. 12(A) shows the processing speed switching operation in a microprocessor that executes the operational flow of FIG. 18, while FIG. 12(B) shows the processing speed switching operation in the microprocessor according to the present invention.

As shown in FIG. 12(B), in the microprocessor MPU according to the present invention, the PLL standby signal PLLSB is made high when a high-speed event, or an event that requires the high-speed processing is recognized, upon which the PLL circuit of the clock pulse generator CPG is activated. In the stabilization wait state until the output frequency of the PLL circuit is stabilized, the system clock signal CK1 is formed according to the clock pulse ck1 having the relatively low frequency as in the low-speed operating mode to made the first internal circuit including the CPU continue the low-speed processing.

Next, when a high-speed processing start request is recognized by the MPU, the clock enable signal CKEN is temporarily made low, temporarily putting the system clock signal CK1 in the clock halt state. Thereafter, when the select control signal COSEL1 is made high, the frequency of the system clock signal CK1 is made four times for example as high as that in the low-speed mode, upon which the first internal circuit including the CPU enters the high-speed processing mode, resulting in the enhanced processing performance.

Figure 18:
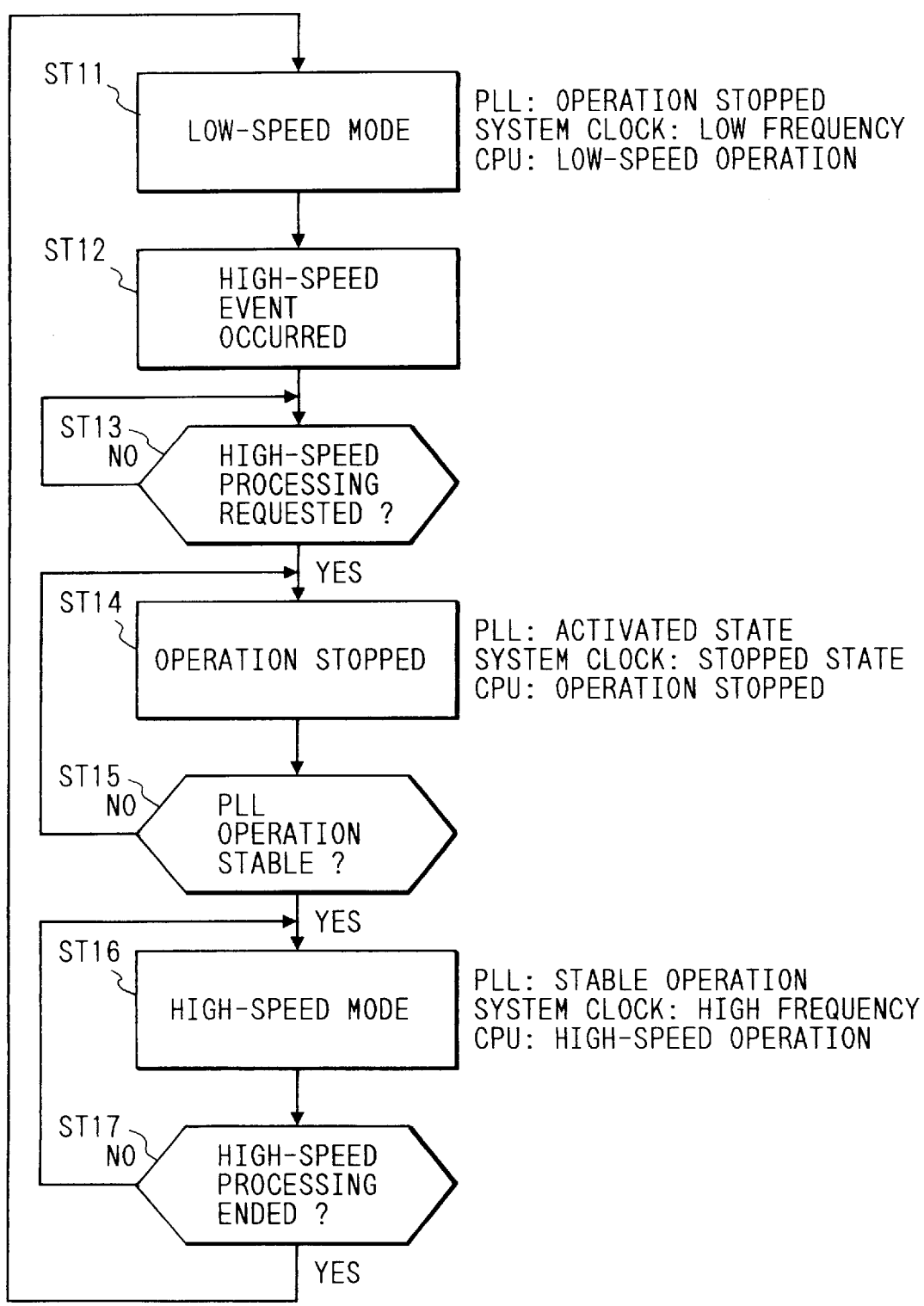
FIG. 18 is a flowchart describing the operation of one example of the clock pulse generator included in the microprocessor.

Meanwhile, in the case of the microprocessor for executing the operational flow of FIG. 18, the PLL circuit of the clock pulse generator is activated upon recognition of a high-speed processing start request and the system clock signal is stopped until the output frequency of the PLL circuit is stabilized. Consequently, it takes a relatively long time from the recognition of the high-speed processing start request to the shifting of the microprocessor MPU to the high-speed mode. If, therefore, an event having a higher priority than the processing to be executed next or an emergency event such as a failure occurs while the system clock signal is in the halt state, there is no way for the microprocessor MPU to cope with such a situation, being put in system shut-down state, so to speak.

In the present embodiment, the PLL circuit is first activated at recognition of a high-speed event, the central processing unit CPU and other components are made to operate at the low speed until the output frequency of the PLL circuit is stabilized, and the CPU and other components are put in the high-speed mode upon recognition of the high-speed processing start request. This novel setup enhances the speed of the microprocessor mode switching operation and realizes the microprocessor being capable of coping with the occurrence of the events having higher priority or emergent events such a failure, enhancing the reliability of the microprocessor.

It will be apparent that, if the microprocessor according to the present invention is used on the above-mentioned portable information terminal PDA, the occurrence of an event required the high-speed processing may be recognized by the state of the input pen micro switch and, at the same time, the necessity for the character pattern recognition processing that requires the high-speed processing thereafter may be predicted. Therefore, at the time of recognizing the starting of a character entry, the PLL circuit of the clock pulse generator CPG may be activated to put the microprocessor in the standby state.

Figure 13:
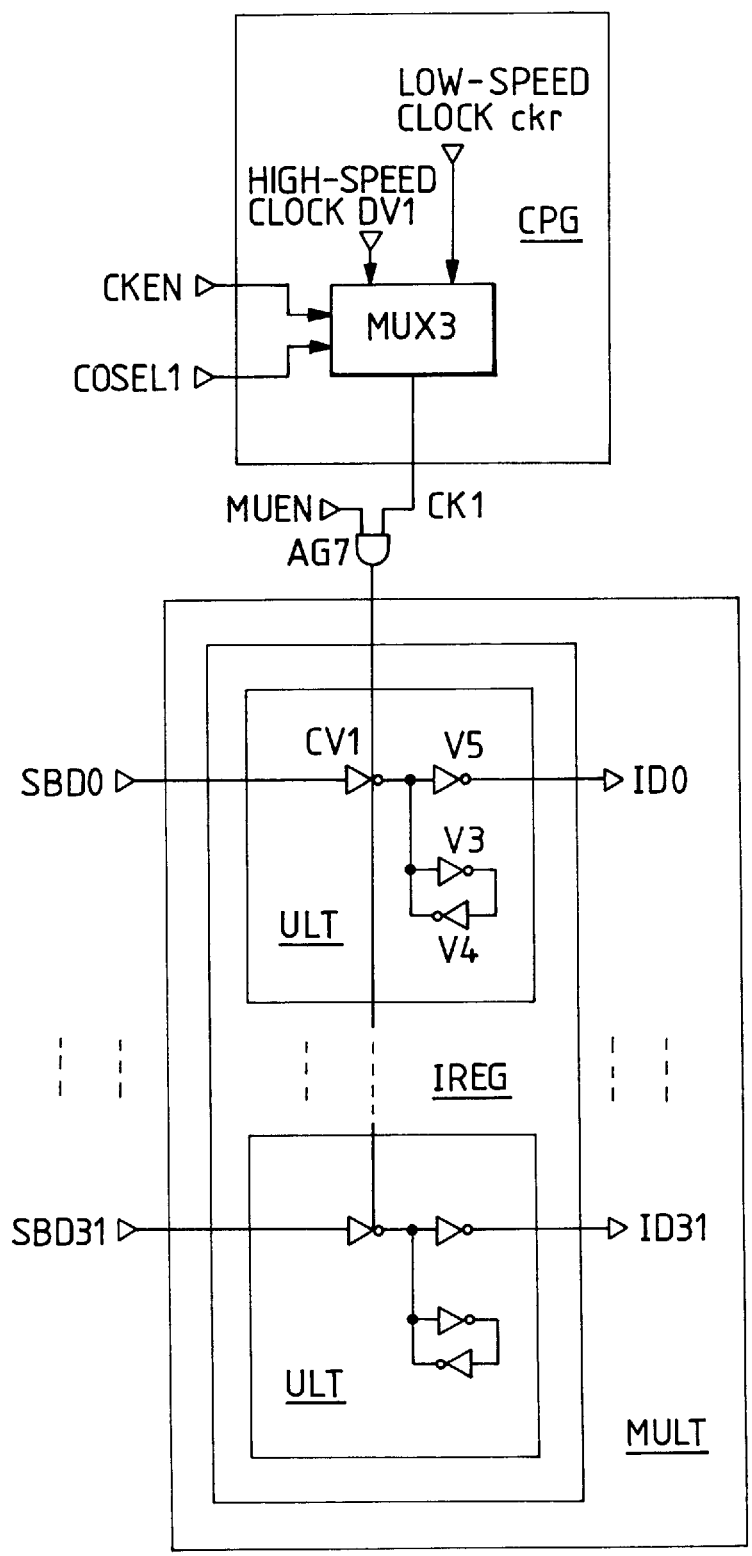
FIG. 13 is a partial configuration diagram illustrating one preferred embodiment of the data transmission path of the microprocessor of FIG. 8.

Referring to FIG. 13, there is shown a part of an example of the data transmission path between the modules of the microprocessor of FIG. 8. As shown in FIG. 13, a multiplier MULT has an input register IREG connected to the 32-bit data bus SBD constituting a system bus S-BUS. The input register IREG has 32 unit latch circuits ULT, each being provided for each of the 32 data bus bits SBD0 through SBD31. Each of the unit latch circuits ULT contains a so-called static latch composed of a pair of cross-connected inverters V3 and V4 as is typically represented in the bit 0 SBD0. An input/output node of the static latch is connected to a corresponding data bus bit of SBD0 to SBD31 via a clocked inverter CV1, the level of the node being inverted by an inverter V5 to become internal input data ID0 to ID31.

A control pin of the clocked inverter CV1 constituting each unit latch ULT of the input register IREG is commonly supplied with the output signal of the AND gate AG7 constituting the clock switch CS2 of FIG. 10. One input pin of this AND gate AG7 is supplied with the output signal of the multiplexer MUX3 of the clock pulse generator CPG, or the system clock signal CK1, while the other input pin of the AG7 is supplied with the module enable signal MUEN. When both the module enable signal MUEN and the system clock signal CK1 are made high, the output signal of the and gate AG7 is selectively made high, upon which the clocked inverter CV1 of each unit latch circuit ULT is selectively put in the transmitting state.

As described before, the frequencies of the system clock signal CK1 are selectively switched between according to the select control signal COSEL1 and, when the clock enable signal CKEN is made low, the CK1 is temporarily put in the halt state and, when the module enable signal MUEN is made low, the output signal of the AND gate AG7 is selectively put in the halt state. However, as described before, since each unit latch circuit ULT of the input register IREG contains the static latch as its basic component, the ULT may stably hold data when the frequencies of the system clock signal CK1 are selectively switched between and the output signal of the AND gate AG7 is put in the halt state.

Figure 14:
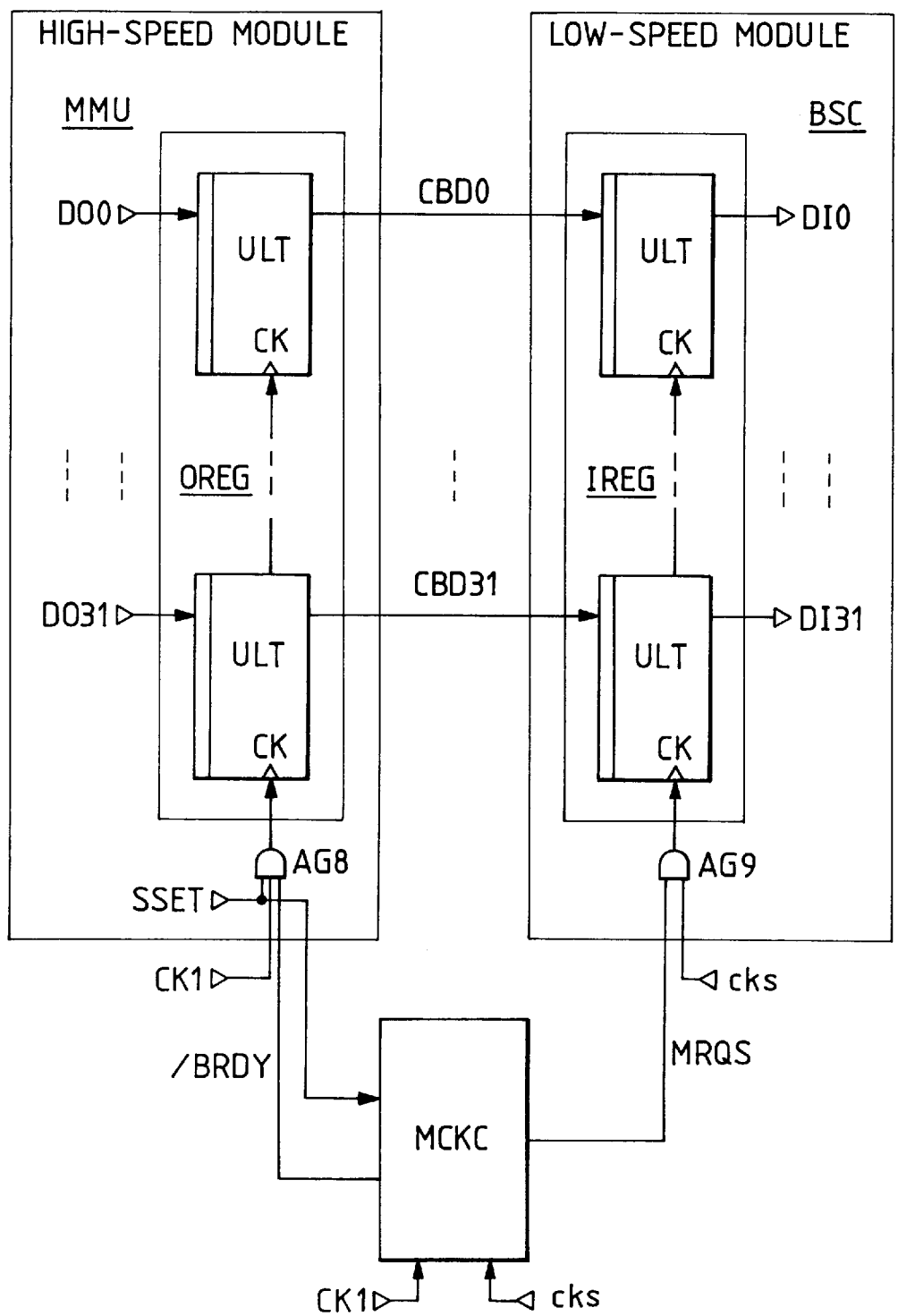
FIG. 14 a partial configuration diagram illustrating one preferred embodiment of the data transmission path from the high-speed module of the microprocessor of FIG. 8 to the low-speed module thereof.
Figure 15:
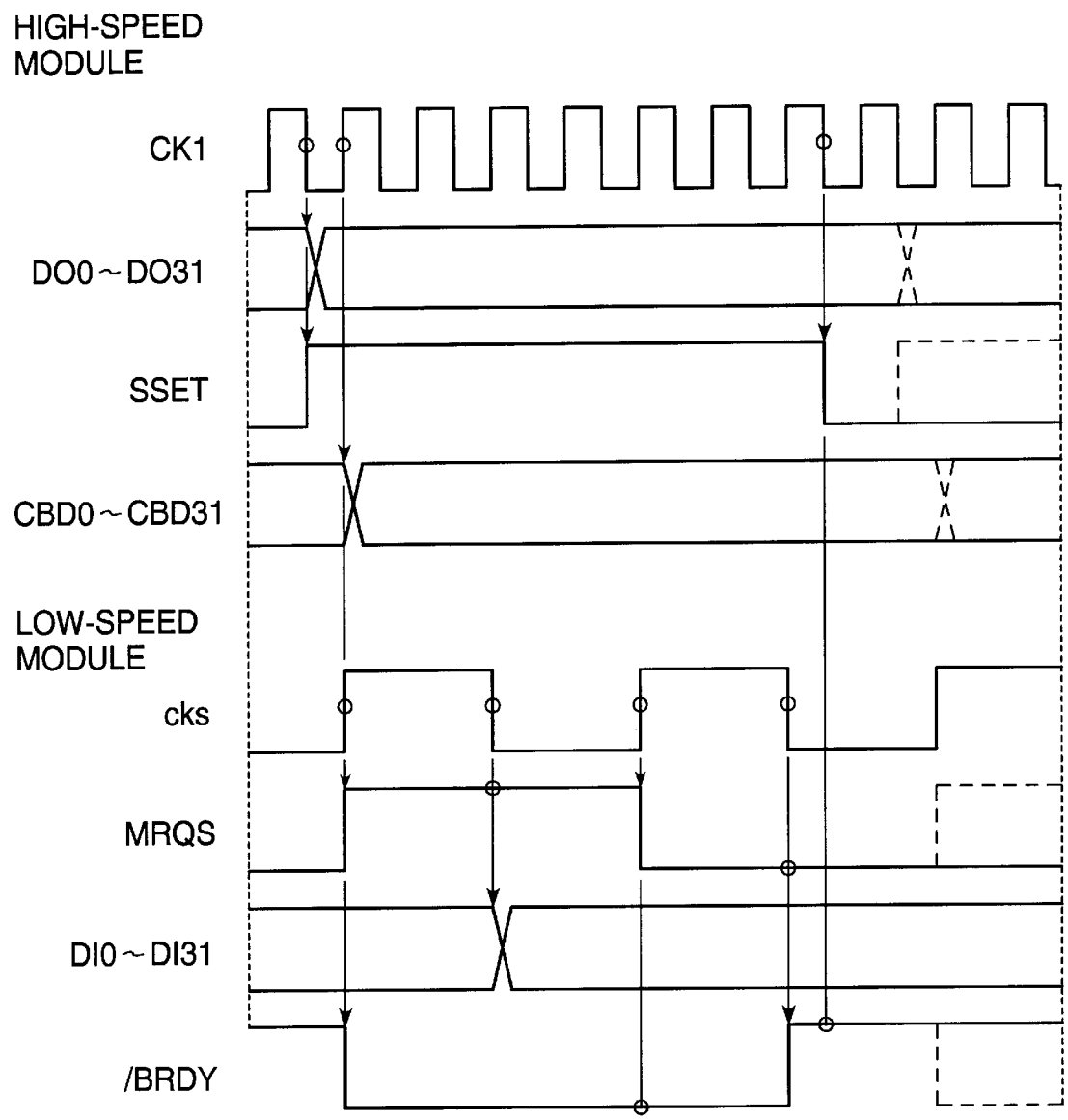
FIG. 15 is a signal waveform diagram illustrating the operation of the data transmission path of FIG. 14.
Figure 16:
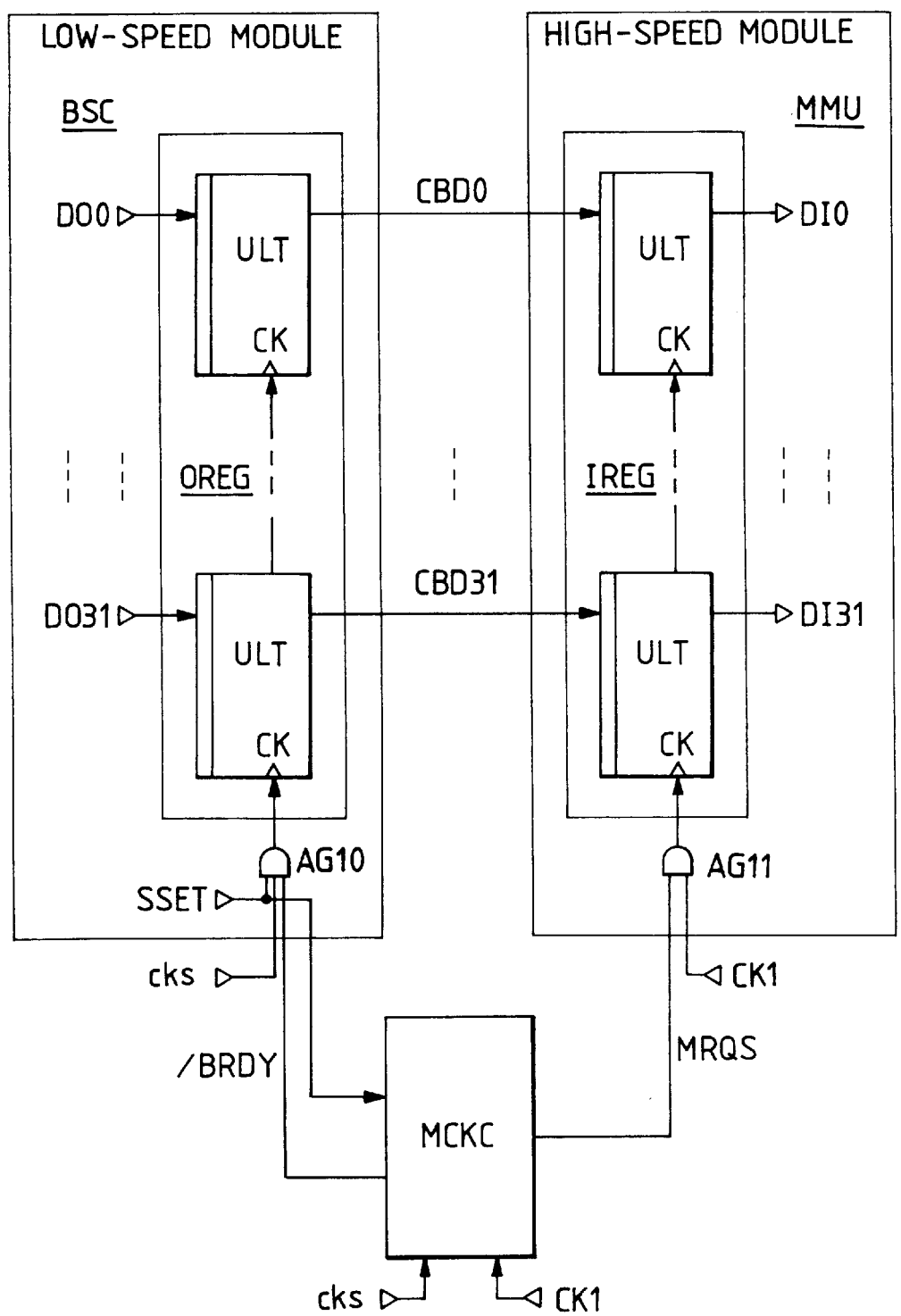
FIG. 16 is a partial configuration diagram illustrating one preferred embodiment of the data transmission path from the low-speed module of the microprocessor of FIG. 8 to the high-speed module thereof.
Figure 17:
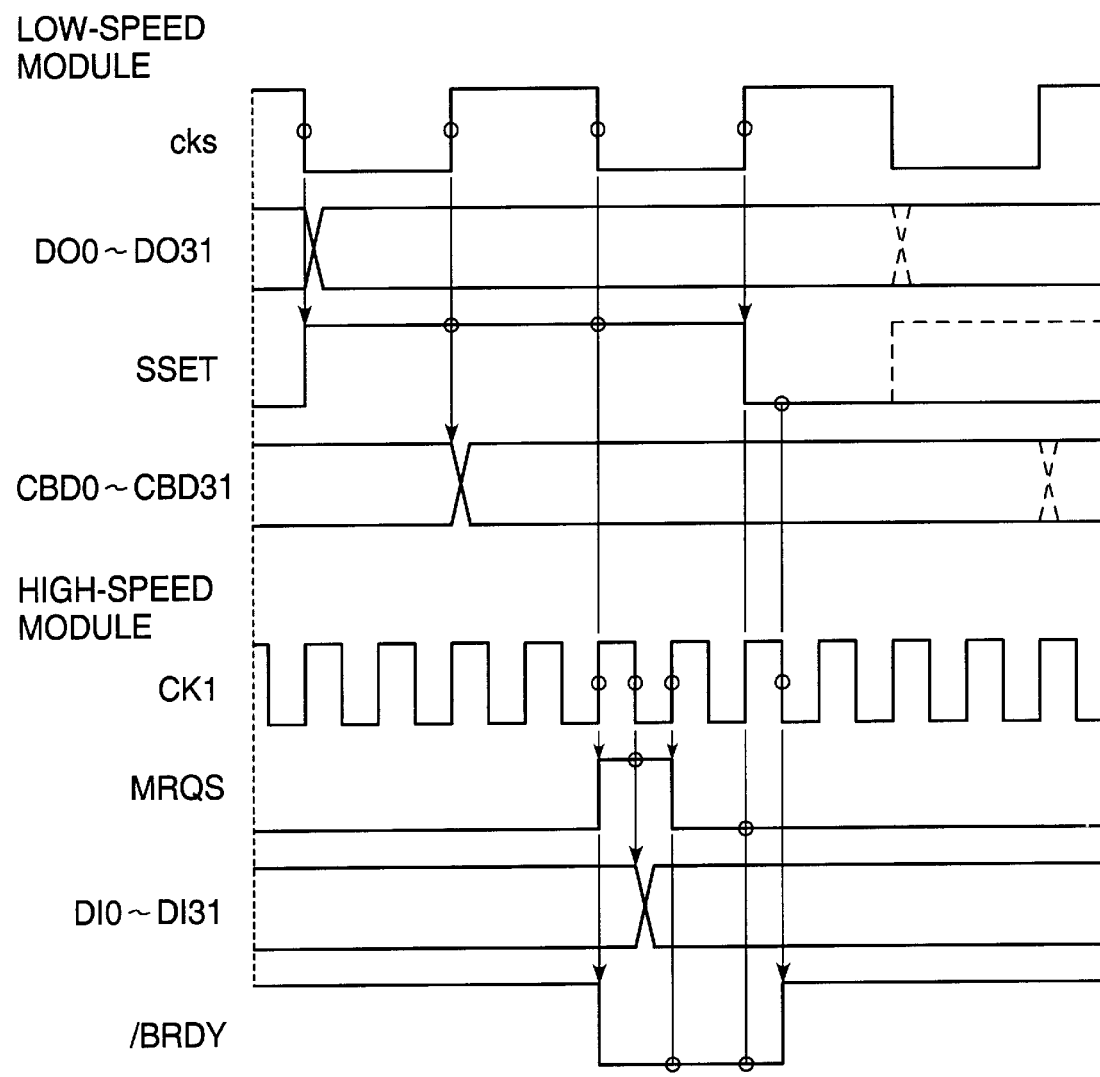
FIG. 17 is a signal waveform diagram illustrating the operation of the data transmission path of FIG. 16.

FIG. 14 shows a part of an example of a data transmission path from the high-speed module to the low-speed speed module of the microprocessor MPU of FIG. 8. FIG. 15 shows waveforms of the data transmission path of FIG. 4. FIG. 16 shows an example of the data transmission path from the low-speed module to the high-speed module of the microprocessor MPU of FIG. 8. FIG. 17 shows the waveforms of the example of FIG. 16. The high-speed module denotes the first internal circuit including the central processing unit CPU, the multiplier MULT, the memory management unit MMU, and the cache memory CACHE, the MMU being shown in FIGS. 14 through 17 as its typical component. The low-speed module denotes the second internal circuit containing the bus controller BSC and the variety of peripheral unit controllers, the BSC being shown in FIGS. 14 through 17 as its typical component. The signal waveforms of FIGS. 15 and 17 indicate the case in which there is a difference of four times between the system clock signals CK1 and cks.

As shown in FIG. 14, the memory management unit MMU, one of the high-speed modules, has an output register OREG of which output pin is connected to a 32-bit data bus CBD constituting the cache bus C-BUS. The output register OREG has 32 unit latch circuits each provided for each of the data bus bits CBD0 through CBD31. The data input pin of each unit latch circuit ULT is supplied with corresponding internal output data D00 to D031 from a preceding stage, not shown, of the memory management unit MMU. The clock input pin ck of the ULT is commonly supplied with the output signal of an AND gate AG8. It should be noted that each unit latch circuit ULT constituting the output register OREG is formed by a static latch having the same constitution as that of each ULT constituting the input register IREG of FIG. 13; therefore the constitution of the ULT of FIG. 14 is not shown.

The first input pin of the AND gate AG8 of the memory management unit MMU is supplied with a set signal SSET. The second input pin of the AG8 is supplied with the system clock signal CK1. The third input pin is supplied with an inverted ready signal /BRDY from a multiclock controller MCKC. The set signal SSET is also supplied to the multiclock controller MCKC which is also supplied with the system clock signals CK1 and cks from the clock pulse generator CPG.

On the other hand, the bus controller BSC, one of the low-speed modules, has the input register IREG of which input pin is connected to the data bus CBD. The input register IREG has 32 unit latch circuits ULT, each being provided for each of the data bus bits CBD0 through CBD31. The data input pin of each ULT is connected to each corresponding data bus bit CBD0 to CBD31. The clock input pin ck of the IREG is commonly supplied with the output signal of an AND gate AG9. It should be noted that the unit latch circuit ULT is the same as the ULT of FIG. 13 in constitution.

One input pin of the AND gate AG9 of the bus controller BSC is supplied with a request signal MRQS from the multiclock controller MCKC. The other input pin of the AG9 is supplied the system clock signal cks.

When the internal output data D00 through D031 are outputted from the preceding stage of the memory management unit MMU, the set signal SSET is made high at a falling edge of the system clock signal CK1 as shown in FIG. 15, but not necessarily limited thereto. Consequently, at the first rising edge of the system clock signal CK1, the output signal of the AND gate AG8 goes high and the internal output data D00 through D031 are captured in the output register OREG of the memory management unit MMU to be outputted to the data bus bits CBD0 through CBD31 of the cache bus C-BUS. When the set signal SSET goes high and at the rising edge of the system clock signal CK1, the request signal MRQS goes high while the inverted ready signal /BRDY goes low. Then, when the request signal MRQS goes high, the system clock signal cks becomes the output signal of the AND gate AG9 to be supplied to the latch circuit ULT constituting the input register IREG of the bus controller BSC. At the falling edge of the signal, data on the data bus bits CBD0 through CBD31 is captured in the input register IREG. The data captured in the IREG is then sent to the internal circuit of the bus controller BSC.

When the data has been captured in the input register IREG of the bus controller BSC, the request signal MRQS is returned to the low level when the inverted ready signal /BRDY goes low and at the a rising edge of the system clock signal cks. The inverted ready signal /BRDY is returned to the high level when the request signal MRQS goes low and at a falling edge of the system clock signal cks. When the inverted ready signal /BRDY goes high and at a falling edge of the system clock signal CK1, the set signal SSET is returned to the low level, putting the data transmission path in the initial state.

Consequently, in the memory management unit MMU, the capture of the internal output data D00 through D031 into the output register OREG is performed only when the inverted ready signal /BRDY goes low and at one rising edge of the system clock signal CK1. When the capture of the data on the data bus bits CBD0 through CBD31 into the input register IREG of the bus controller BSC has been completed, the inverted ready signal /BRDY is returned to the high level with a sufficient timing margin. Therefore, although the memory management unit MMU and the bus controller BSC operate on the system clock signals CK1 and cks having different frequencies, the data transfer between the two is performed securely, resulting in the stable operation.

Referring to FIG. 16, a bus controller BSC, one of the low-speed modules, has an output register OREG of which output pin is connected to a 32-bit data bus CBD constituting the cache bus C-BUS. The output register OREG has 32 unit latch circuits ULT, each being provided for each of the data bus bits CBD0 through CBD31. The data input pin of each unit latch circuit ULT is supplied with corresponding data D00 to D031 from the preceding stage, not shown, of the bus controller BSC. A clock input pin ck of the ULT is commonly supplied with the output signal of a AND gate AG10. It should be noted that each of the unit latches ULT constituting the output register OREG is the same as each of the unit latches ULT constituting the input register IREG of FIG. 13 in constitution.

The first input pin of the AND gate AG10 of the bus controller BSC is supplied with the set signal SSET. The second input pin of the AG10 is supplied with the system clock signal cks. The third input pin of the AG10 is supplied with the inverted ready signal /BRDY from the multiclock controller MCKC. The set signal SSET is also supplied to the multiclock controller MCKC. The multiclock controller MCKC is further supplied with the system clock signals cks and CK1 from the clock pulse generator CPG.

On the other hand, the memory management unit MMU, one of the high-speed modules, has an input register IREG of which input pin is connected to the data bus CBD. The input register IREG has 32 unit latches ULT, each being provided for corresponding bit of the data bus bits CBD0 through CBD31. The clock input pin ck of the ULT is commonly supplied with the output signal of an AND gate AG11. It should be noted that each of the unit latch circuits ULT constituting the input register IREG is the same as each of the unit latch circuits ULT constituting the input register IREG of FIG. 13 in constitution.

One input pin of the AND gate AG11 of the memory management unit MMU is supplied with the request signal MRQS from the multiclock controller MCKC. The other input pin is supplied with the system clock signal CK1.

When the internal output data D00 through D031 are outputted from the preceding stage in the bus controller BSC, the set signal SSET is made high at a falling edge of the system clock signal CK1 as shown in FIG. 17, but not necessarily limited thereto. Consequently, at the first rising edge of the system clock signal cks, the output signal of the AND gate AG10 goes high and the internal output data D00 through D031 are captured in the output register OREG of the bus controller BSC to be outputted to the data bus bits CBD0 through CBD31 of the cache bus C-BUS. When the set signal SSET goes high and at the falling edge of the system clock signal cks, the request signal MRQS goes high while the inverted ready signal /BRDY goes low. Then, when the request signal MRQS goes high, the system clock signal CK1 becomes the output signal of the AND gate AG11 to be supplied to the latch circuit ULT constituting the input register IREG of the memory management unit MMU. At the falling edge of the signal, data on the data bus bits CBD0 through CBD31 is captured in the input register IREG. The data captured in the IREG is then sent to the internal circuit of the memory management unit MMU.

When the data has been captured in the input register IREG of the memory management unit MMU, the request signal MRQS is returned to the low level when the inverted ready signal /BRDY goes low and at the next rising edge of the system clock signal CK1. The set signal SSET is returned to the low level when the request signal MRQS and the inverted ready signal /BRDY go low and at the next rising edge of the system clock signal cks. When the set signal SSET goes low and at the falling edge of the system clock signal CK1, the inverted ready signal /BRDY is returned to the high level, putting the data transmission path in the initial state.

Consequently, in the memory management unit MMU, the capture of the output data D00 through D031 into the input register IREG is performed only when the inverted ready signal /BRDY goes low and at one rising edge of the system clock signal CK1. When the capture of the data on the data bus bits CBD0 through CBD31 into the input register IREG of the memory management unit MMU has been completed, the inverted ready signal /BRDY is returned to the high level with a sufficient timing margin. Therefore, although the bus controller BSC and the memory management unit MMU operate on the system clock signals cks and CK1 having different frequencies, the data transfer between the two is performed securely, resulting in the stable operation.

The above-mentioned set signal SSET is formed by a module on the data output side, but not necessarily limited thereto.

From the above-mentioned preferred embodiments of the present invention, the following advantageous effects will be obtained:

(1) In a microprocessor incorporating a PLL circuit using a clock pulse having a relatively low frequency as an input clock signal of a reference frequency to form an oscillating pulse of a relatively high frequency by multiplying the input clock signal, the operation of the PLL circuit is stopped in the low-speed mode to supply the clock pulse of the relatively low frequency to the microprocessor as a system clock signal, and, in the high-speed mode, the PLL circuit is activated upon reception of an event requiring high-speed processing. Until the operation of the PLL circuit is stabilized and the request for high-speed processing comes, the above-mentioned clock pulse having the relatively low frequency is kept supplied continuously to the microprocessor as the system clock signal. When the operation of the PLL circuit is stabilized and the request comes, the oscillating pulse having the relatively high frequency formed by the PLL circuit is supplied to the microprocessor as the system clock. This novel setup permits the high-speed switching of the microprocessor from the low-speed operating mode to the high-speed operating mode.

(2) According to the setup of (1) above, the microprocessor may be kept operating until the output frequency of the PLL circuit is stabilized, thereby allowing the microprocessor to cope with an unpredictable situation such as the occurrence of a priority event or a failure.

(3) As a result of the effect of (2) above, the reliability of the microprocessor is enhanced while reducing the power consumption of the microprocessor.

(4) In the above-mentioned effects (1) through (3), when switching from the low-speed operating mode to the high-speed operating mode, the system clock signal may be halted for a significantly short time to prevent a hazard noise from being caused by the clock switching, thereby stabilizing the microprocessor operation at the mode switching.

(5) In the above-mentioned effects (1) through (4), the portions constituting the microprocessor are made modular and the system clock signal is supplied to modules selected by the module enable signal. This setup permits the selective isolation of modules no more required by the system configuration and the selective halt of the operation of unused modules according to the contents of the processing by the microprocessor, thereby further enhancing the power saving of the microprocessor.

(6) In the above-mentioned effects (1) through (5), the data transfer between modules operating on the system clock having different frequencies may be performed by means of a static latch containing a pair of cross-connected inverters for example, thereby preventing the loss of data at the system clock switching or halt. This setup further stabilizes the microprocessor operation.

(7) The microprocessor defined in the above (1) through (6) may be used for a portable information terminal provided with an input pen to save the power to the microprocessor and to the portable information terminal, thereby stabilizing the operation of the terminal.

(8) A module to which each system clock signal is supplied may be selected by the module enable signal and the frequencies of the supplied system clock signal may be changed, performing necessary processing at a relatively low power consumption.

(9) The frequencies of each system clock signal may be changed by the control data to be set to the corresponding register and a module to which the system clock signal is supplied may be selected, thereby enhancing the flexibility of the microprocessor.

While the preferred embodiments of the present invention have been described using specific terms, such description is for illustrative purposes only, and it is to be understood that changes and variations may be made without departing from the spirit or scope of the appended claims. For example, referring to FIG. 1, the clock pulse generator that forms the system clock signal of the relatively high frequency based on the clock pulse of the relatively low frequency may not be necessarily the PLL circuit and the oscillator XOSC is not necessarily limited to that based on the crystal resonator. The number of phases of each clock pulse and system clock signal may be set to any other values and any other block configurations may be used for the clock pulse generator CPG.

The constitution of the PLL circuit illustrated in FIGS. 2, 3(A), 3(B), 4(A), and 4(B) is not subject to the restrictions imposed by the above-mentioned preferred embodiments of the present invention. The logical constitutions of the multiplexers such as the MUX3 and MUX4 illustrated in FIGS. 5(A) and 5(B) may take any other forms of embodiments. Referring to FIG. 6, the phase and frequency relationships between the clock pulses and the system clock signals are not subject to the restrictions imposed by the above-mentioned preferred embodiments of the present invention. The same holds true with the valid levels of the clock enable signal CKEN and the select control signals COSEL1 and COSEL2. When changing the frequencies of the system clock signals CK1 and cks without involving a hazard noise, there is no need for especially providing a clock halt period. Referring to FIG. 7, if it is guaranteed that the output frequency of the PLL circuit is stabilized during the period between the activation of the PLL circuit and the request for starting the high-speed processing, the determination of step ST4 may be omitted.

Referring to FIG. 8, the microprocessor MPU takes any other block configurations as well as any other path forms. The substrate layout of FIG. 9 is only for the purpose of example and therefore does not impose any restrictions on the present invention. Referring to FIG. 10, the second internal circuit such as the bus controller BSC may be supplied with the system clock signal cks via one or three or more clock drivers.

Referring to FIG. 11, the method of recognizing the occurrence of a high-speed processing event and a high-speed processing start in the portable information terminal may be any other relevant methods. For example, the time at which character entry starts may be recognized as the occurrence of a high-speed processing event and the time at which a predetermined area on the LCD is specified with the input pen may be recognized as the request for the high-speed processing start. The external view of the portable information terminal PDA is not limited by the embodiment of FIG. 11. In FIGS. 12(A) and 12(B), the time relationship in each processing stage at the mode changing is not absolute. In FIG. 13, the constitution of the unit latch circuit ULT included in the input register IREG and others may take any other forms of embodiments. In FIGS. 14 and 16, the methods of controlling the output register OREG and the input register IREG are not limited to the ones illustrated and the timing relationships and valid levels thereof may take any other forms.

In the descriptions made so far, the invention has been described as applied to the microprocessor incorporating the PLL circuit and the portable information terminal based on this microprocessor. However, the present invention is not necessarily limited to such applications. For example, the present invention is also applicable to microprocessors incorporating any other clock generators and any other systems based on such microprocessors. It will be apparent that the present invention is widely applicable to any microprocessors at least having a clock pulse generator and a plurality of operating modes based on system clock signals of different frequencies and any systems based on such microprocessors.

The typical advantages provided by the invention disclosed herein will be briefly described as follows. Namely, in a microprocessor incorporating a PLL circuit using a clock pulse having a relatively low frequency as an input clock signal of a reference frequency to form an oscillating pulse of a relatively high frequency by multiplying the input clock signal, the operation of the PLL circuit is stopped in the low-speed mode to supply the clock pulse of the relatively low frequency to the microprocessor as a system clock signal, and, in the high-speed mode, the PLL circuit is activated upon reception of an event requiring high-speed processing. Until the operation of the PLL circuit is stabilized and the request for high-speed processing comes, the above-mentioned clock pulse having the relatively low frequency is kept supplied continuously to the microprocessor as the system clock signal. When the operation of the PLL circuit is stabilized and the request comes, the oscillating pulse having the relatively high frequency formed by the PLL circuit is supplied to the microprocessor as the system clock. This novel setup permits the high-speed switching of the microprocessor from the low-speed operating mode to the high-speed operating mode. Accordingly, the microprocessor may be kept operating until the output frequency of the PLL circuit is stabilized, thereby allowing the microprocessor to cope with an unpredictable situation such as the occurrence of a priority event or a failure. As a result, the microprocessor is realized capable of switching from the low-speed operating mode to the high-speed operating mode may be performed at a high speed and coping with an unpredictable event caused at the mode switching.

When switching from the low-speed operating mode to the high-speed operating mode, the system clock signal may be halted for a significantly short time to prevent a hazard noise from being caused by the clock switching, thereby stabilizing the microprocessor operation at the mode switching, eventually enhancing the reliability of the microprocessor.

The portions constituting the microprocessor are made modular and the system clock signal is supplied to modules selected by the module enable signal. This setup permits the selective isolation of modules no more required by the system configuration and the selective halt of the operation of unused modules according to the contents of the processing by the microprocessor, thereby further enhancing the power saving of the microprocessor.

The data transfer between modules operating on the system clock signal having different frequencies may be performed by means of a static latch containing a pair of cross-connected inverters for example, thereby preventing the loss of data at the system clock switching or halt. This setup further stabilizes the microprocessor operation.

The above-mentioned microprocessor may be used for a portable information terminal provided with an input pen, thereby stabilizing the operation of the portable information terminal while reducing the power to the microprocessor and the portable information terminal.

What is claimed is:

1. A microprocessor comprising:
 a first internal circuit receiving a first clock signal and operating based on the first clock signal;
 a clock generator receiving a second clock signal having a predetermined frequency and, in response to an activating signal, forming a third clock signal having a frequency higher than the predetermined frequency, the clock generator requiring a first time period from being activated to forming the third clock signal;
 a switch circuit supplying, in response to a switching signal, the third clock signal or a fourth clock signal having a frequency lower than that of the third clock signal to the first internal circuit as the first clock signal; and
 a control circuit supplying the activating signal to the clock generator when the fourth clock signal is supplied to the first internal circuit as the first clock signal via the switch circuit and thereafter outputting the switching signal for switching from the fourth clock signal to the third clock signal, wherein the switch circuit stops supplying the fourth clock signal to the first internal circuit as the first clock signal for a second time period and then supplies the third clock signal to the first internal circuit as the first clock signal.

2. A microprocessor according to claim 1, wherein the fourth clock signal has a frequency lower than that of the second clock signal.

3. A microprocessor according to claim 2, further comprising:
 a divider dividing the second clock signal to form the fourth clock signal.

4. A microprocessor according to claim 1, wherein the clock generator comprises a phase-locked loop circuit.

5. A microprocessor according to claim 4, further comprising:
 an oscillator generating the second clock signal; and
 a divider dividing the second clock signal to form the fourth clock signal.

6. A microprocessor according to claim 5, wherein the oscillator includes an oscillation circuit which generates the second clock signal using a crystal resonator and wherein the clock generator includes a phase-locked loop circuit.

7. A microprocessor according to claim 6, further comprising an external terminal which is used to couple the oscillation circuit provided internal to the microprocessor with the crystal resonator provided external to the microprocessor.

8. A microprocessor according to claim 1, wherein the control circuit supplies to the switching circuit a signal for prohibiting the fourth clock signal from being output as the first clock signal before switching from the fourth clock signal to the third clock signal so that the fourth clock signal and the third clock signal are not supplied to the first internal circuit for the second time period.

9. A microprocessor according to claim 1, wherein the first internal circuit includes a central processing unit operating in response to the first clock signal.

10. A microprocessor according to claim 9, wherein the control circuit includes a register to which control data is set by the central processing unit and a controller forming the switching signal and the activating signal according to data set to the register.

11. A microprocessor according to claim 9, wherein, when the third clock signal is being supplied as the first clock signal, the central processing unit operates faster than when the fourth clock signal is being supplied as the first clock signal.

12. A microprocessor comprising:
 a first internal circuit that operates on a first system clock signal and is put in a low-speed mode or a high-speed mode by switching between frequencies of the first system clock signal;
 a clock generator forming, from a first clock signal of a first frequency, a second clock signal of a second frequency higher than the first frequency, the clock generator requiring a first time period from being activated until its output frequency is stabilized; and
 a multiplexer which selects the first clock signal in the low-speed mode and during the first time period, which selects the second clock signal in the high-speed mode, and which transmits the selected clock signal to the first internal circuit as the first system clock signal, wherein, in switching from the low-speed mode to the high-speed mode, the multiplexer stops transmitting the first clock signal to the first internal circuit for a second time period and then transmits the second clock signal to the first internal circuit as the first system clock signal.

13. A microprocessor according to claim 12, wherein the clock generator comprises a phase-locked loop circuit.

14. A microprocessor according to claim 13, wherein switching from the selection of the first clock signal to the second clock signal by the multiplexer is performed during the second time period in which the first clock signal and the second clock signal are not supplied as the first system clock signal to the first internal circuit.

15. A microprocessor according to claim 12, wherein
the first internal circuit has a plurality of first modules operating in response to the first system clock signal;
the microprocessor includes a second internal circuit including a plurality of second modules that receive a third clock signal as a second system clock signal and operate in response to the second system clock signal; and
the plurality of first modules include a central processing unit, a multiplier and a memory management unit, and the plurality of second modules include a bus controller and a peripheral unit controller.

16. A microprocessor according to claim 15 further comprising:
a first selector selectively supplying the first system clock signal to the plurality of first modules; and
a second selector selectively supplying the second system clock to the plurality of second modules.

17. A microprocessor according to claim 15 further comprising a static latch circuit transferring data between the plurality of first modules and the plurality of second modules.

18. A microprocessor according to claim 12, wherein the clock generator is activated by an occurrence of an event requiring a high-speed processing by the high-speed mode and the first internal circuit is put in the high-speed mode upon receiving a request for high-speed processing start occurring after the occurrence of the event.

19. A microprocessor according to claim 18, wherein the microprocessor is used in a portable information terminal having an input pen, recognizes a start of character entry by the input pen as the occurrence of the event requiring the high-speed processing by the high-speed mode, and recognizes an end of the character entry by the input pen as the request for the high-speed processing start.

20. A microprocessor operable in a first operation mode and a second operation mode, comprising:
a first clock generator generating a first clock signal and a second clock signal;
an internal circuit receiving a clock signal and operating in response to the clock signal;
a second clock generator which receives the second clock signal and which generates a third clock signal in response to an activating signal, wherein the second clock generator requires a first time period for forming the third clock signal;
a switch circuit providing, in response to a switch signal, the first clock signal or the third clock signal to the internal circuit as the clock signal; and
a control circuit which provides the switch signal, wherein the first clock signal is provided to the internal circuit as the clock signal in response to a first request for operating the microprocessor in the first operation mode, and which provides the activating signal and thereafter provides the switch signal in response to a second request for operating the microprocessor in the second operation mode, wherein the first clock signal is provided to the internal circuit via the switch circuit during the first time period, the switch circuit inhibits providing the first clock signal and the third clock signal to the internal circuit during a second time period, and thereafter the third clock signal is provided to the internal circuit via the switch circuit.

21. A microprocessor according to claim 20, wherein the internal circuit includes a central processing unit operating in response to the clock signal.

22. A microprocessor according to claim 21, wherein the control circuit includes a register to which control data is set by the central processing unit and a controller forming the switch signal and the activating signal according to data set in the register.

23. A microprocessor according to claim 21, wherein the first clock generator includes an oscillator generating the second clock signal and a divider dividing the second clock signal to generate the first clock signal.

24. A microprocessor according to claim 23, wherein the oscillator includes an oscillation circuit which generates the second clock signal using a crystal resonator and wherein the second clock generator includes a phase-locked loop circuit.

25. A microprocessor according to claim 24, further comprising an external terminal that couples the oscillation circuit provided internal to the microprocessor to the crystal resonator provided external to the microprocessor.

26. A microprocessor according to claim 25, wherein the third clock signal has a frequency that is higher than that of the first clock signal.

27. In a microprocessor, a method of supplying clock signals to first and second modules of the microprocessor, comprising the steps of:
generating first and second clock signals;
supplying the first clock signal to the first modules and supplying the second clock signal to the second modules in a first mode of operation of the microprocessor;
determining a predictor event as a predictor for entering a second mode of operation of the microprocessor;
generating a third clock signal having a frequency higher than the first clock signal in response to determination of the predictor event, wherein the third clock signal is generated after a first time period, wherein the first clock signal is supplied to the first modules during the first time period;
determining a request to enter the second mode operation;
stopping the supply of the first clock signal to the first modules; and
supplying the third clock signal to the first modules, wherein the microprocessor operates in the second mode of operation.

28. The method of claim 27, wherein the first clock signal is generating by dividing the second clock signal.

29. The method of claim 27, wherein the first modules comprise a central processing unit, a multiplier and/or a memory management unit, wherein the second modules comprise a bus controller and/or a peripheral unit controller.

30. The method of claim 27, wherein the first operation mode comprises a low-speed operation mode, wherein the second operation mode comprises a high-speed operation mode.

31. The method of claim 27, wherein the predictor event comprises user input of data to a system incorporating the microprocessor.

32. The method of claim 27, wherein the predictor event comprises a beginning of pen input of data to the system.

33. The method of claim 32, wherein the request to enter the second mode of operation is determined in response to an end of pen input of data to the system.

34. The method of claim 33, wherein the second mode of operation comprises recognition of pen input data.

* * * * *